(12) United States Patent
Asakawa

(10) Patent No.: US 12,734,818 B2
(45) Date of Patent: Sep. 15, 2026

(54) RECORDING METHOD AND RECORDING APPARATUS

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 114 days.

(21) Appl. No.: 18/788,230

(22) Filed: Jul. 30, 2024

(65) Prior Publication Data

US 2025/0042183 A1 Feb. 6, 2025

(30) Foreign Application Priority Data

Jul. 31, 2023 (JP) ................................ 2023-124463

(51) Int. Cl.
*C09D 11/54* (2014.01)
*B41J 2/15* (2006.01)
(Continued)

(52) U.S. Cl.
CPC .............. *B41J 2/2114* (2013.01); *B41J 2/15* (2013.01); *B41J 11/0022* (2021.01); (Continued)

(58) Field of Classification Search
CPC ........................................................ B41J 2/15
See application file for complete search history.

(56) References Cited

U.S. PATENT DOCUMENTS

2009/0073204 A1* 3/2009 Takekoshi ............. B41J 2/2114 347/9
2019/0217615 A1* 7/2019 Yoshikawa ................ B41J 2/15
(Continued)

FOREIGN PATENT DOCUMENTS

JP 2020-019180 A 2/2020

*Primary Examiner* — Shelby L Fidler
(74) *Attorney, Agent, or Firm* — Harness, Dickey & Pierce, P.L.C.

(57) ABSTRACT

A recording method which uses a water-based ink composition and a treatment liquid containing an aggregating agent, includes: a main scanning to eject the ink composition and the treatment liquid from an ink jet head so as to be adhered to a recording medium while the ink jet head is transferred with respect to the recording medium; a sub-scanning to transport the recording medium in a sub-scanning direction which intersects a direction of the main scanning; and a ventilation step of sending a wind to the recording medium in the main scanning. In the main scanning, by a portion of the ink jet ink head to eject the ink composition and the treatment liquid located upstream in the sub-scanning direction, the ink composition and the treatment liquid are overlapped and adhered to the same main scanning region of the recording medium by the same main scanning, and by a portion of the ink jet ink head to eject the ink composition and the treatment liquid located downstream in the sub-scanning direction, the ink composition is adhered to the recording medium, and when the ink composition is adhered thereto, the treatment liquid is not overlapped and adhered to the same main scanning region of the recording medium by the same main scanning. In addition, when the main scanning is performed, the recording medium to which the ink composition and the treatment liquid are adhered has a surface temperature of 33° C. or less.

11 Claims, 7 Drawing Sheets

(51) Int. Cl.

*B41J 2/21* (2006.01)
*B41J 11/00* (2006.01)
*B41J 29/377* (2006.01)
*B41M 7/00* (2006.01)
*C09D 11/107* (2014.01)

(52) U.S. Cl.

CPC .......... *B41J 29/377* (2013.01); *B41M 7/0018* (2013.01); *C09D 11/107* (2013.01); *C09D 11/54* (2013.01)

(56) References Cited

U.S. PATENT DOCUMENTS

| | | | | |
|---|---|---|---|---|
| 2020/0039232 | A1* | 2/2020 | Asakawa | B41J 2/16517 |
| 2021/0129567 | A1* | 5/2021 | Seguchi | C09D 11/322 |
| 2021/0276334 | A1* | 9/2021 | Mizutani | C09D 11/40 |
| 2022/0203698 | A1* | 6/2022 | Watanabe | B41J 2/2114 |
| 2022/0410590 | A1* | 12/2022 | Yamazaki | B41J 2/145 |

* cited by examiner

FIG. 1
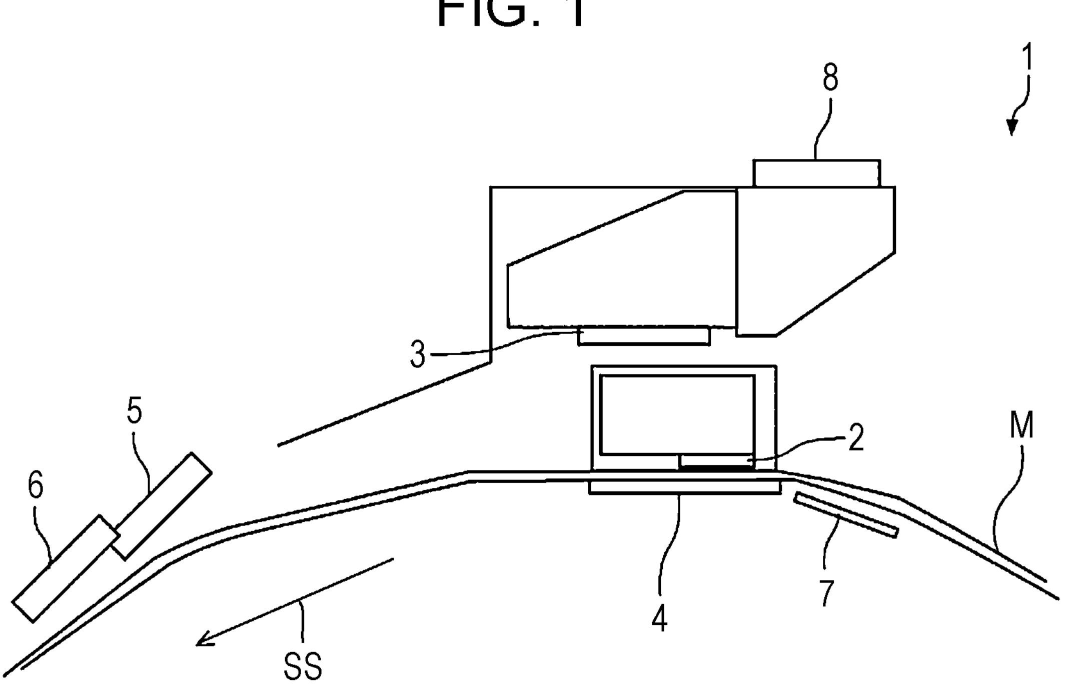
FIG. 2
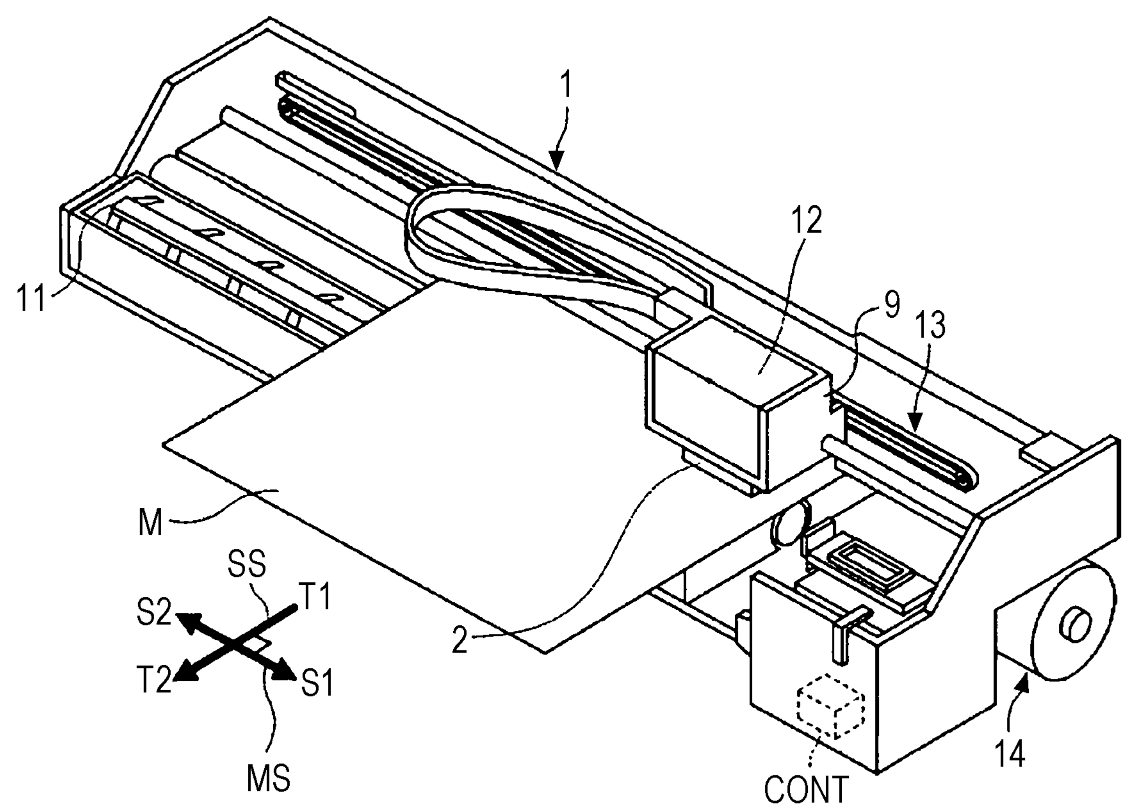

FIG. 5

TABLE 1:

TREATMENT LIQUID COMPOSITION

| | | | TREATMENT LIQUID A | TREATMENT LIQUID B | TREATMENT LIQUID C | TREATMENT LIQUID D |
|---|---|---|---|---|---|---|
| WATER-SOLUBLE LOW MOLECULAR WEIGHT ORGANIC COMPOUND | ALKANEDIOL | PG (BOILING POINT 188°C) | 25.0 | 25.0 | 20.0 | 20.0 |
| AGGREGATING AGENT | ORGANIC ACID | MALONIC ACID | – | – | – | 3.6 |
| | POLYVALENT METAL SALT | CALCIUM FORMATE | 3.6 | 1.8 | – | – |
| | CATIONIC RESIN | CATIOMASTER PD-7 (ACTIVE INGREDIENT) | – | – | 3.6 | – |
| SURFACTANT | SILICONE BASE | BYK-348 | 0.5 | 0.5 | 0.5 | 0.5 |
| PURE WATER | | | BALANCE | BALANCE | BALANCE | BALANCE |
| TOTAL | | | 100 | 100 | 100 | 100 |

FIRST COLOR INK COMPOSITION

| | | | INK A | INK B |
|---|---|---|---|---|
| WATER-SOLUBLE LOW MOLECULAR WEIGHT ORGANIC COMPOUND | ALKANEDIOL | PG (BOILING POINT 188°C) | 15.0 | 15.0 |
| | ALKANOLAMINE | TIPA (BOILING POINT 301°C) | 1.0 | 1.0 |
| SURFACTANT | CATIONIC RESIN | BYK-348 | 0.5 | 0.5 |
| PIGMENT DISPERSION LIQUID | | BLACK PIGMENT (ACTIVE INGREDIENT) | 2.0 | 0.8 |
| RESIN PARTICLES | ACRYLIC BASE | JONCRYL 631 (ACTIVE INGREDIENT) | 5.0 | 5.0 |
| | POLYOLEFIN BASE | HITECH E-6500 (ACTIVE INGREDIENT) | 0.5 | 0.5 |
| PURE WATER | | | BALANCE | BALANCE |
| TOTAL | | | 100 | 100 |

SECOND COLOR INK COMPOSITION

| | | | INK A |
|---|---|---|---|
| WATER-SOLUBLE LOW MOLECULAR WEIGHT ORGANIC COMPOUND | ALKANEDIOL | PG (ALKANEDIOL 188°C) | 15.0 |
| | ALKANEDIOL | TIPA (ALKANEDIOL 301°C) | 1.0 |
| SURFACTANT | CATIONIC RESIN | BYK-348 | 0.5 |
| PIGMENT DISPERSION LIQUID | | YELLOW PIGMENT (ACTIVE INGREDIENT) | 3.0 |
| RESIN PARTICLES | ACRYLIC BASE | JONCRYL 631 (ACTIVE INGREDIENT) | 5.0 |
| | POLYOLEFIN BASE | HITECH E-6500 (ACTIVE INGREDIENT) | 0.5 |
| PURE WATER | | | BALANCE |
| TOTAL | | | 100 |

FIG. 6

TABLE 2:

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| TREATMENT LIQUID | A | A | A | A | A | A | A | A | A | A |
| FIRST COLOR INK | A | A | A | A | A | A | A | A | A | A |
| VISCOSITY INCREASE RATE | 5.2 TIMES | 5.2 TIMES | 5.2 TIMES | 5.2 TIMES | 5.2 TIMES | 5.2 TIMES | 5.2 TIMES | 5.2 TIMES | 5.2 TIMES | 5.2 TIMES |
| SECOND COLOR INK | A | A | A | A | A | A | A | A | A | A |
| VISCOSITY INCREASE RATE | 6.5 TIMES | 6.5 TIMES | 6.5 TIMES | 6.5 TIMES | 6.5 TIMES | 6.5 TIMES | 6.5 TIMES | 6.5 TIMES | 6.5 TIMES | 6.5 TIMES |
| ADHESION AMOUNT OF TREATMENT LIQUID (TO COLOR) | 12% | 12% | 8% | 16% | 12% | 18% | 8% | 12% | 12% | 12% |
| USE FREQUENCY OF NOZZLES FOR TREATMENT LIQUID | 48% | 48% | 32% | 64% | 24% | 36% | 64% | 48% | 48% | 24% |
| HEAD ARRANGEMENT | ARRANGEMENT 1 | ARRANGEMENT 1 | ARRANGEMENT 1 | ARRANGEMENT 1 | ARRANGEMENT 2 | ARRANGEMENT 2 | ARRANGEMENT 3 | ARRANGEMENT 1 | ARRANGEMENT 1 | ARRANGEMENT 1 |
| RECORDING MEDIUM | M1 | M1 | M1 | M1 | M1 | M1 | M1 | M1 | M1 | M1 |
| SURFACE TEMPERATURE | 25°C | 25°C | 25°C | 25°C | 25°C | 25°C | 25°C | 30°C | 30°C | 25°C |
| WIND TEMPERATURE | 25°C | 25°C | 25°C | 25°C | 25°C | 25°C | 25°C | 30°C | 30°C | 25°C |
| WIND VELOCITY | 3 m/s | 1.5 m/s | 3 m/s | 3 m/s | 3 m/s | 3 m/s | 3 m/s | 3 m/s | 3 m/s | 3 m/s |
| NUMBER OF MAIN SCANNINGS | 8 TIMES | 8 TIMES | 8 TIMES | 8 TIMES | 8 TIMES | 8 TIMES | 8 TIMES | 8 TIMES | 8 TIMES | 16 TIMES |
| CONTINUOUS PRINTING TIME | 2 HOURS | 2 HOURS | 2 HOURS | 2 HOURS | 2 HOURS | 2 HOURS | 2 HOURS | 2 HOURS | 1 HOUR | 2 HOURS |
| INTERCOLOR BLEEDING | A | B | B | AA | B | A | AA | AA | AA | AA |
| WHITENING OF PRINTED MATTER | A | A | A | B | A | A | B | A | A | A |
| HEAD DEW CONDENSATION | A | A | A | A | A | A | A | B | A | A |
| PRINTING RATE | A | A | A | A | A | A | A | A | A | B |

FIG. 7

TABLE 3:

| | EXAMPLE 11 | EXAMPLE 12 | EXAMPLE 13 | EXAMPLE 14 | EXAMPLE 15 | EXAMPLE 16 | EXAMPLE 17 | EXAMPLE 18 | EXAMPLE 19 | EXAMPLE 20 |
|---|---|---|---|---|---|---|---|---|---|---|
| TREATMENT LIQUID | A | B | B | A | A | A | B | C | D | A |
| FIRST COLOR INK | B | A | A | A | A | A | A | A | A | A |
| VISCOSITY INCREASE RATE | 3.0 TIMES | 5.2 TIMES | 5.2 TIMES | 5.2 TIMES | 5.2 TIMES | 5.2 TIMES | 5.2 TIMES | 6.1 TIMES | 4.5 TIMES | 5.2 TIMES |
| SECOND COLOR INK | A | A | A | A | A | A | A | A | A | A |
| VISCOSITY INCREASE RATE | 6.5 TIMES | 6.5 TIMES | 6.5 TIMES | 6.5 TIMES | 6.5 TIMES | 6.5 TIMES | 6.5 TIMES | 7.4 TIMES | 5.3 TIMES | 6.5 TIMES |
| ADHESION AMOUNT OF TREATMENT LIQUID (TO COLOR) | 12% | 16% | 12% | 18% | 9% | 6% | 24% | 12% | 12% | 12% |
| USE FREQUENCY OF NOZZLES FOR TREATMENT LIQUID | 48% | 64% | 48% | 72% | 72% | 24% | 96% | 48% | 48% | 48% |
| HEAD ARRANGEMENT | ARRANGEMENT 1 | ARRANGEMENT 1 | ARRANGEMENT 1 | ARRANGEMENT 1 | ARRANGEMENT 3 | ARRANGEMENT 1 | ARRANGEMENT 1 | ARRANGEMENT 1 | ARRANGEMENT 1 | ARRANGEMENT 1 |
| RECORDING MEDIUM | M1 | M1 | M1 | M1 | M1 | M1 | M1 | M1 | M1 | M1 |
| SURFACE TEMPERATURE | 25°C | 25°C | 25°C | 25°C | 25°C | 25°C | 25°C | 25°C | 25°C | 30°C |
| WIND TEMPERATURE | 25°C | 25°C | 25°C | 25°C | 25°C | 25°C | 25°C | 25°C | 25°C | 25°C |
| WIND VELOCITY | 3 m/s | 3 m/s | 3 m/s | 3 m/s | 3 m/s | 3 m/s | 3 m/s | 3 m/s | 3 m/s | 3 m/s |
| NUMBER OF MAIN SCANNINGS | 8 TIMES | 8 TIMES | 8 TIMES | 8 TIMES | 8 TIMES | 8 TIMES | 8 TIMES | 8 TIMES | 8 TIMES | 8 TIMES |
| CONTINUOUS PRINTING TIME | 2 HOURS | 2 HOURS | 2 HOURS | 2 HOURS | 2 HOURS | 2 HOURS | 2 HOURS | 2 HOURS | 2 HOURS | 1 HOUR |
| INTERCOLOR BLEEDING | B | B | C | AA | AA | C | A | A | C | AA |
| WHITENING OF PRINTED MATTER | A | A | A | C | C | A | C | C | A | A |
| HEAD DEW CONDENSATION | A | A | A | A | A | A | A | A | A | B |
| PRINTING RATE | A | A | A | A | A | A | A | A | A | A |

FIG. 8

TABLE 4:

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | REFERENCE EXAMPLE 1 | REFERENCE EXAMPLE 2 |
|---|---|---|---|---|---|---|---|---|
| TREATMENT LIQUID | A | A | A | A | A | A | A | A |
| FIRST COLOR INK | A | A | A | A | A | A | A | A |
| VISCOSITY INCREASE RATE | 5.2 TIMES | 5.2 TIMES | 5.2 TIMES | 5.2 TIMES | 5.2 TIMES | 5.2 TIMES | 5.2 TIMES | 5.2 TIMES |
| SECOND COLOR INK | A | A | A | A | A | A | A | A |
| VISCOSITY INCREASE RATE | 6.5 TIMES | 6.5 TIMES | 6.5 TIMES | 6.5 TIMES | 6.5 TIMES | 6.5 TIMES | 6.5 TIMES | 6.5 TIMES |
| ADHESION AMOUNT OF TREATMENT LIQUID (TO COLOR) | 12% | 12% | 12% | 12% | 12% | 12% | 12% | 12% |
| USE FREQUENCY OF NOZZLES FOR TREATMENT LIQUID | 48% | 48% | 12% | 12% | 24% | 48% | 12% | 48% |
| HEAD ARRANGEMENT | ARRANGEMENT 1 | ARRANGEMENT 1 | ARRANGEMENT 4 | ARRANGEMENT 4 | ARRANGEMENT 5 | ARRANGEMENT 1 | ARRANGEMENT 4 | ARRANGEMENT 1 |
| RECORDING MEDIUM | M1 | M1 | M1 | M1 | M1 | M1 | M2 | M2 |
| SURFACE TEMPERATURE | 25°C | 35°C | 25°C | 35°C | 25°C | 35°C | 25°C | 35°C |
| WIND TEMPERATURE | 25°C | 35°C | 25°C | 35°C | 25°C | 25°C | 25°C | 25°C |
| WIND VELOCITY | 0 m/s | 3 m/s | 3 m/s | 3 m/s | 3 m/s | 3 m/s | 3 m/s | 3 m/s |
| NUMBER OF MAIN SCANNINGS | 8 TIMES | 8 TIMES | 8 TIMES | 8 TIMES | 8 TIMES | 8 TIMES | 8 TIMES | 8 TIMES |
| CONTINUOUS PRINTING TIME | 2 HOURS | 2 HOURS | 2 HOURS | 2 HOURS | 2 HOURS | 2 HOURS | 2 HOURS | 2 HOURS |
| INTERCOLOR BLEEDING | D | AA | D | AA | AA | AA | A | AA |
| WHITENING OF PRINTED MATTER | A | A | A | A | A | A | A | A |
| HEAD DEW CONDENSATION | B | C | A | C | A | C | A | B |
| PRINTING RATE | A | A | A | A | C | A | A | A |

RECORDING METHOD AND RECORDING APPARATUS

The present application is based on, and claims priority from JP Application Serial Number 2023-124463, filed Jul. 31, 2023, the disclosure of which is hereby incorporated by reference herein in its entirety.

BACKGROUND

1. Technical Field

The present disclosure relates to a recording method and a recording apparatus.

2. Related Art

Since an ink jet method is able to form an image having a high quality on a recording medium, various types of technical developments thereof have been carried out. For example, besides development of a recording apparatus using an ink jet method, development of a composition to be used by the recording apparatus has also been actively performed. Furthermore, research has also been widely executed not only on the combination among a recording apparatus, an ink composition, a treatment liquid, a recording medium, and/or the like but also on a recording method using at least one of those mentioned above.

For example, there has been a recording method to obtain an excellent image quality in such a manner that by the use of a treatment liquid, the fluidity of an ink is decreased and fixed at an early stage. In particular, when a low-absorbing recording medium or a non-absorbing recording medium is used, since being not likely to be absorbed in the recording medium, ink droplets are mixed with each other thereon and are allowed to cause bleeding unevenness in some cases, and hence, the use of the treatment liquid has been studied.

In addition, in a serial type printer, a (simultaneous ejection) recording method has been investigated in such a manner that a head (nozzle line) to eject an ink and a nozzle line to eject a treatment liquid are disposed side by side, and the ink and the treatment liquid are adhered to the same main scanning region of a recording medium by the same main scanning. In addition, another recording method has also been investigated in such a manner that a nozzle line to eject a treatment liquid is disposed upstream than a nozzle line to eject an ink in a transport direction of a recording medium, and the treatment liquid and the ink are adhered to the recording medium in this order. Furthermore, to decrease the fluidity of an ink at an early stage is also investigated in such a manner that when the ink is adhered to a recording medium, the recording medium is heated to promote drying of the ink.

JP-A-2020-019180 has disclosed a simultaneous ejection recording method performed in such a manner that a treatment liquid and an ink are ejected to a recording medium by one main scanning, that is, a recording method performed in such a manner that the recording medium is heated to 35° C., and the treatment liquid and the ink are adhered thereto.

However, the "simultaneous ejection" is not good enough to obtain an excellent image quality. In addition, in order to obtain an excellent image quality by heating the recording medium, volatile components in the treatment liquid and/or the ink are evaporated, and as a result, dew condensation may be generated on an ink jet ink head in some cases. Accordingly, among recording methods using a simultaneous ejection, a recording method which is not likely to generate the dew condensation on the ink jet head and which can form an image having a preferable image quality has been desired.

SUMMARY

According to an aspect of the present disclosure, there is provided a recording method which uses a water-based ink composition and a treatment liquid containing an aggregating agent, the recording method comprising: a main scanning to eject the ink composition and the treatment liquid from an ink jet head so as to be adhered to a recording medium while the ink jet head is transferred with respect to the recording medium; a sub-scanning to transport the recording medium in a sub-scanning direction which intersects a direction of the main scanning; and a ventilation step of sending a wind to the recording medium in the main scanning. According to the recording method described above, in the main scanning, by a portion of the ink jet ink head to eject the ink composition and the treatment liquid located upstream in the sub-scanning direction, the ink composition and the treatment liquid are overlapped and adhered to the same main scanning region of the recording medium by the same main scanning, and by a portion of the ink jet ink head to eject the ink composition and the treatment liquid located downstream in the sub-scanning direction, the ink composition is adhered to the recording medium, and when the ink composition is adhered thereto, the treatment liquid is not overlapped and adhered to the same main scanning region of the recording medium by the same main scanning. In addition, when the main scanning is performed, the recording medium to which the ink composition and the treatment liquid are adhered has a surface temperature of 33° C. or less.

According to another aspect of the present disclosure, there is provided a recording apparatus to perform the recording method described above, the apparatus comprising the ink jet head described above and a ventilation mechanism to perform the ventilation step described above.

BRIEF DESCRIPTION OF THE DRAWINGS

FIG. 1 is a schematic view of one example of an ink jet recording apparatus.

FIG. 2 is a schematic view of a carriage and its vicinity of one example of the ink jet recording apparatus.

FIG. 5 is Table 1 showing compositions of treatment liquids and inks used in Examples, Comparative Examples, and Reference Examples.

FIG. 6 is Table 2 showing conditions and evaluation results of Examples.

FIG. 7 is Table 3 showing conditions and evaluation results of Examples.

FIG. 8 is Table 4 showing conditions and evaluation results of Comparative Examples and Reference Examples.

DESCRIPTION OF EMBODIMENTS

Figure 3:
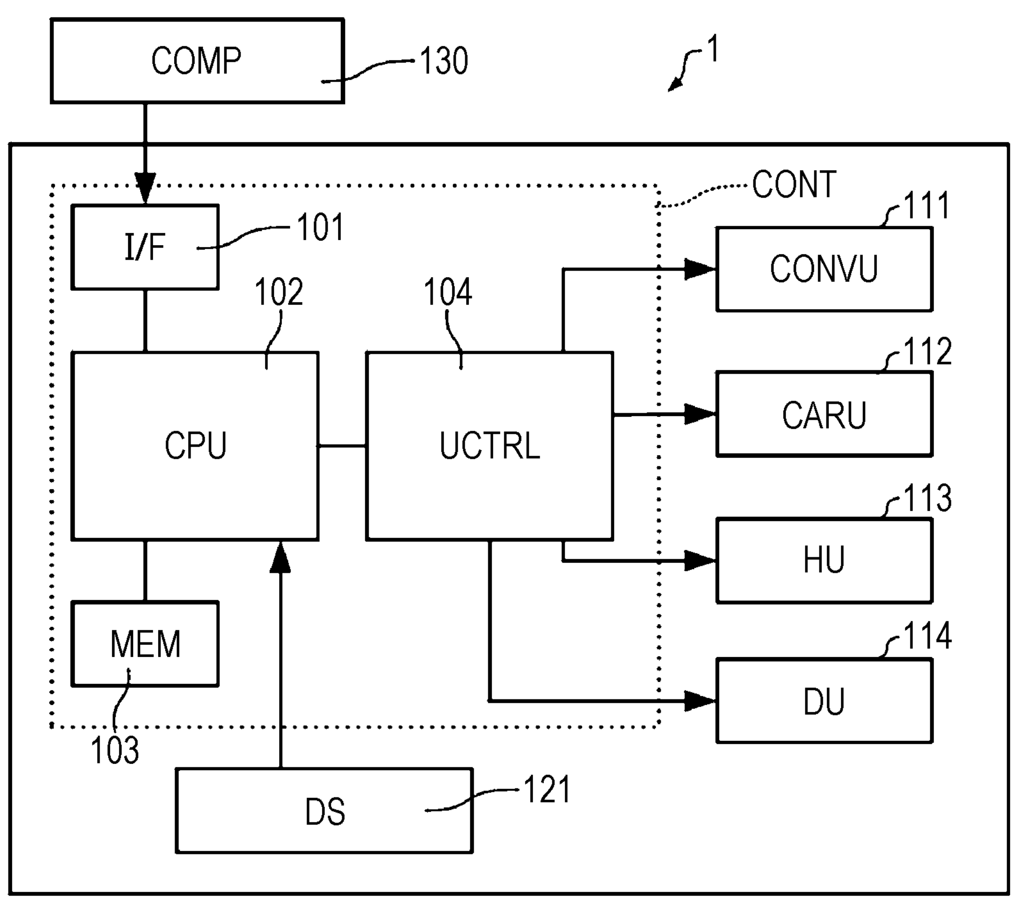
FIG. 3 is a block diagram of one example of the ink jet recording apparatus.

Hereinafter, embodiments of the present disclosure will be described. The following embodiments are described to explain examples of the present disclosure. The present disclosure is not limited at all to the following embodiments and also includes various types of modified embodiments to be performed without departing from the scope of the present disclosure. In addition, all the constituents described below are not always required to be essential constituents of the present disclosure.

1. Recording Method

A recording method of this embodiment is performed using a water-based ink composition and a treatment liquid containing an aggregating agent and includes a main scanning, a sub-scanning, and a ventilation step.

1.1. Ink Composition

An ink composition of this embodiment is a water-based ink composition and may also contain, if needed, a colorant, a surfactant, water, an organic solvent, resin particles, a wax, and the like. In addition, in this specification, the "ink composition" may be simply abbreviated as the "ink" or the like in some cases. In addition, in this specification, a "water-based ink" represents an ink containing water as a primary solvent component, and an "ink jet ink" represents an ink to be ejected from an ink jet head by an ink jet method and to be used for recording.

1.1.1. Water

The ink composition according to this embodiment is a water-based ink and is a composition containing water as one primary solvent.

Although the water is not particularly limited, for example, pure water, such as ion exchange water, ultrafiltration water, reverse osmosis water, or distilled water; or water, such as ultrapure water, in which ionic impurities are removed as much as possible may be mentioned. In addition, in the case in which water sterilized by UV radiation, addition of hydrogen peroxide, or the like is used, when the water-based ink composition is stored for a long period of time, generation of fungi and bacteria can be prevented. As a result, the storage stability tends to be further improved.

A content of the water with respect to a total mass of the ink composition is preferably 40 percent by mass or more, more preferably 40 to 98 percent by mass, even more preferably 50 to 90 percent by mass, further preferably 55 to 85 percent by mass, even further preferably 60 to 80 percent by mass, and particularly preferably 65 to 75 percent by mass.

1.1.2. Other Components

1.1.2.1 Colorant

The ink composition may contain a colorant. As the colorant, at least one selected from the group consisting of a pigment and a dye may be used.

Pigment

As the pigment, an inorganic pigment and an organic pigment can both be used. Since the pigment is used as the colorant, a light resistance of the ink composition may be preferably improved in some cases.

As the inorganic pigment, for example, a carbon black (C.I. Pigment Black 7), such as a furnace black, a lamp black, an acetylene black, or a channel black, an iron oxide, or a titanium oxide may be used.

As the organic pigment, for example, there may be mentioned an azo pigment, such as an insoluble azo pigment, a condensed azo pigment, an azo lake, or a chelating azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelate (such as a basic dye chelate or an acidic dye chelate), a dye lake (such as a basic dye lake or an acidic dye lake), a nitro pigment, a nitroso pigment, an aniline black, or a daylight fluorescent pigment.

Furthermore, as a carbon black used as a black ink, for example, there may be mentioned No. 2300, No. 900, MCF88, No. 33, No. 40, No. 45, No. 52, MA7, MA8, MA100, or No. 2200B (manufactured by Mitsubishi Chemical Corporation); or Raven 5750, Raven 5250, Raven 5000, Raven 3500, Raven 1255, or Raven 700 (manufactured by Carbon Columbia).

As a pigment used for a white ink, C.I. Pigment 6, 18, or 21 may be mentioned.

As a pigment used for a yellow ink, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

As a pigment used for a magenta ink, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; or C.I. Pigment Violet 19, 23, 32, 33, 36, 38, 43, or 50. A solid solution formed from at least two of those pigments mentioned above may also be used.

As a pigment used for a cyan ink, for example, there may be mentioned C.I. Pigment Blue 1, 2, 3, 15, 15:1, 15:2, 15:3, 15:4, 16, 18, 22, 25, 60, 65, or 66; or C.I. Vat Blue 4 or 60.

As a pigment other than the magenta, the cyan, and the yellow, for example, there may be mentioned C.I. Pigment Green 7 or 10; C.I. Pigment Brown 3, 5, 25, or 26; or C.I. Pigment Orange 1, 2, 5, 7, 13, 14, 15, 16, 24, 34, 36, 38, 40, 43, or 63.

The pigments mentioned above may be used alone, or at least two types thereof may be used in combination.

When the pigment is used for the ink composition, the average particle diameter thereof is preferably 300 nm or less and more preferably 50 to 200 nm. When the average particle diameter described above is in the range described above, the reliability, such as the ejection stability and/or the dispersion stability, of the ink composition can be made more excellent, and in addition, an image having an excellent image quality is likely to be formed. In addition, the average particle diameter in this specification may be measured by a dynamic light scattering method.

Pigment Dispersion

The pigment mentioned above may be present in the form of a pigment dispersion in which the pigment is dispersed in the ink composition. In addition, the pigment dispersion of this specification indicates a concept including a pigment dispersion liquid and a slurry (low viscosity aqueous dispersion) of the pigment.

Although the pigment dispersion is not particularly limited, for example, a self-dispersible pigment, a polymer-dispersion pigment, or a pigment covered with a polymer may be mentioned.

Self-Dispersible Pigment

The self-dispersible pigment is a pigment which can be dispersed or dissolved in an aqueous medium without using a dispersant. In addition, "dispersed or dissolved in an aqueous medium without using a dispersant" indicates the state in which even when a dispersant to disperse a pigment is not used, the pigment is stably present in an aqueous medium because of a hydrophilic group on the surface of the pigment. Hence, foaming caused by degradation in defoaming property due to a dispersant hardly occurs, and an ink excellent in ejection stability is likely to be prepared. In addition, since a large increase in viscosity caused by a dispersant can be suppressed, a larger amount of the pigment can be contained, and the ink jet ink can be easily handled so that a print density can be sufficiently increased.

The hydrophilic group described above is preferably at least one selected from the group consisting of —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, and —$NR_3$.

In addition, in the chemical formulas mentioned above, M represents a hydrogen atom, an alkali metal, ammonium, a substituted or unsubstituted phenyl group, or an organic ammonium, and R represents an alkyl group having 1 to 12 carbon atoms or a substituted or unsubstituted naphthyl group. In addition, the above M and R are selected independently from each other.

The self-dispersible pigment is manufactured, for example, by performing a physical treatment or a chemical treatment on the pigment so as to bind (graft) the hydrophilic group on the surface of the pigment. As the physical treatment described above, for example, a vacuum plasma treatment may be mentioned. In addition, as the chemical treatment, for example, there may be mentioned a wet oxidation method in which oxidation is performed in water using an oxidant or a method in which by binding p-aminobenzoic acid on a pigment surface, a carboxy group is bound thereto with a phenyl group interposed therebetween.

Polymer-Dispersion Pigment

The polymer-dispersion pigment is a pigment dispersible by polymer dispersion. Although a polymer used for the polymer-dispersion pigment is not limited to the following, for example, a dispersion polymer used for the dispersion of the pigment has a glass transition temperature (Tg) of preferably 80° C. or less and more preferably 75° C. or less. When the Tg described above is 80° C. or less, the fixability of the ink may be made preferable in some cases.

In addition, the weight average molecular weight of the polymer measured by a gel permeation chromatography (GPC) is preferably 10,000 to 200,000. Accordingly, the storage stability of the ink may be made further preferable in some cases. In addition, the weight average molecular weight (Mw) in this specification may be measured as a weight average molecular weight on a polystyrene basis using a gel permeation chromatography (GPC) of L7100 system manufactured by Hitachi, Ltd.).

As the polymer described above, since the fixability and glossiness of the ink tend to be made more excellent, a polymer in which at least 70 percent by mass of constituent components thereof is a copolymer between (meth)acrylate and (meth)acrylic acid is preferable. The polymer described above is preferably formed by polymerization of a monomer component including at least 70 percent by mass of an alkyl (meth)acrylate having 1 to 24 carbon atoms and/or a cyclic alkyl (meth)acrylate having 3 to 24 carbon atoms. Although a concrete example of the monomer component is not particularly limited, for example, there may be mentioned methyl (meth)acrylate, ethyl (meth)acrylate, propyl (meth) acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth) acrylate, stearyl (meth)acrylate, isostearyl (meth)acrylate, tetramethylpiperidyl (meth)acrylate, dicyclopentanyl (meth) acrylate, dicyclopentenyl (meth)acrylate, dicyclopentenyloxy (meth)acrylate, or behenyl (meth)acrylate. In addition, as another polymerization monomer component, for example, a hydroxy (meth)acrylate having a hydroxyl group, such as hydroxyethyl (meth)acrylate, hydroxypropyl (meth) acrylate, or diethylene glycol (meth)acrylate, an urethane (meth)acrylate, or an epoxy (meth)acrylate may also be used.

In addition, in this specification, "(meth)acryl" represents acryl or methacryl, and "(meth)acrylate" represents acrylate or methacrylate.

(Pigment Covered with Polymer)

In addition, since the fixability, glossiness, and color reproducibility of the ink tend to be made excellent, among the polymer-dispersion pigments described above, a pigment covered with a polymer, that is, a microencapsulated pigment, is preferably used.

The pigment covered with a polymer is obtained by a phase-transfer emulsification method. That is, the polymer described above is dissolved in an organic solvent, such as methanol, ethanol, isopropyl alcohol, n-butanol, acetone, methyl ethyl ketone, or dibutyl ether. After the pigment is added to the solution thus obtained, a neutralizer and water are added thereto, and a kneading/dispersing treatment is performed, so that an oil droplet-in-water type dispersion is prepared. In addition, when the organic solvent is removed from the dispersion thus obtained, the pigment covered with the polymer can be obtained as a water dispersion. The kneading/dispersing treatment can be performed, for example, using a ball mill, a roll mill, a bead mill, a high-pressure homogenizer, or a high-speed stirring type dispersing machine.

As the neutralizer, for example, ethylamine, a tertiary amine such as trimethylamine, lithium hydroxide, sodium hydroxide, potassium hydroxide, or ammonia is preferable. The water dispersion thus obtained preferably has a pH of 6 to 10.

As the polymer to cover the pigment, a polymer having a weight average molecular weight of approximately 10,000 to 150,000 measured by a GPC is preferable since the pigment is stably dispersed.

Dye

The dye is not particularly limited, and for example, an acidic dye, a direct dye, a reactive dye, and a basic dye may be used.

The dyes mentioned above may be used alone, or at least two types thereof may be used in combination.

A content of the colorant (solid content) with respect to the total mass of the ink composition is, for example, preferably 1 percent by mass or more, more preferably 2 percent by mass or more, and further preferably 3 percent by mass or more. In addition, the content of the colorant (solid content) with respect to the total mass of the ink composition is preferably 10 percent by mass or less, more preferably 8 percent by mass or less, and further preferably 6 percent by mass or less. In addition, the content of the colorant described above is preferably 5 percent by mass or more. When the content of the colorant is in the range described above, the storage stability may be made more excellent in some cases.

1.1.2.2 Water-Soluble Low Molecular Weight Compound

The ink composition may contain a water-soluble low molecular weight compound. In the water-soluble low molecular weight compound in this section, a colorant, a polyvalent metal salt, an organic acid, and an organic amine are not included. The water-soluble low molecular weight compound primarily indicates an organic solvent or a solid compound.

A "water-soluble" compound indicates a compound having a solubility of more than 10 g in 100 g of water at 20° C. As the water-soluble low molecular weight compound, for example, there may be mentioned a compound in the form of a liquid at ordinary temperature or a compound in the form of a solid at ordinary temperature. Since the ink composition contains a water-soluble low molecular weight compound, the clogging recovery property of the ink composition, the storage stability thereof, the image quality, and the like can be made more excellent.

As a method to determine the solubility of the water-soluble low molecular weight compound is as described below. First, in an environment at 20° C., a predetermined amount of the water-soluble low molecular weight compound is mixed with 100 g of water and then stirred for 30 minutes. After the stirring is performed, when a phase separation or a sea-island structure is not observed in a liquid compound at ordinary temperature, the compound is judged to be dissolved. In addition, when a solid compound at ordinary temperature is dissolved without any residues, this compound is judged to be dissolved.

As described above, when a predetermined amount of the compound is mixed with 100 g of water, among the predetermined amounts judged to be dissolved in water, the largest predetermined amount is determined as the solubility. A compound having a solubility of more than 10 g is regarded as the water-soluble low molecular weight compound. In addition, the water-soluble low molecular weight compound can also be regarded as a compound to be perfectly mixed with water or a compound to be mixed with water.

In this specification, "perfect mixing with water" indicates the case in which water and the compound are dissolved with each other, that is, the case in which the solubility of the compound in 100 g of water at 20° C. is infinite. In addition, "mixing with water" indicates the case in which water and the compound each have a finite solubility and indicates the case in which the solubility of the compound in 100 g of water at 20° C. is at least more than 10 g. In addition, although the solubility of the water-soluble low molecular weight compound is more than 10 g, an upper limit of the solubility is not limited and may also be infinite. The solubility is preferably 11 g or more and more preferably 50 g or more.

A molecular weight of the water-soluble low molecular weight compound is preferably 500 or less as the weight average molecular weight. Furthermore, the molecular weight described above is more preferably 400 or less and further preferably 300 or less. In addition, the ink composition preferably contains as the water-soluble low molecular weight compound, a compound having a standard boiling point of 150° C. to 350° C., and a compound having a standard boiling point of 150° C. to 300° C. is more preferable. In addition, as the water-soluble low molecular weight compound, a compound having a melting point of 90° C. or less is preferably contained, and a compound having a melting point of 80° C. or less is more preferably contained. In addition, the melting point described above is preferably −70° C. or more.

As the water-soluble low molecular weight compound having a solubility of more than 10 g in 100 g of water at 20° C., for example, a resin dissolving material, a polyol, or a glycol ether may be mentioned. As the resin dissolving material, for example, an amide, a sulfur-containing solvent, or a cyclic ether may be mentioned. In particular, a resin dissolving material, a polyol, or a glycol ether is preferable.

As the water-soluble low molecular weight compound, more preferably, there may be mentioned an amide, a sulfur-containing solvent, or a cyclic ether each having a standard boiling point of 150° C. to 300° C. or a polyol or a glycol ether each having a standard boiling point of 150° C. to 250° C.

The water-soluble low molecular weight compound is contained, with respect to the total mass of the ink composition, at a content of preferably 40 percent by mass or less, more preferably 1 percent by mass or more, even more preferably 5 to 30 percent by mass, and further preferably 10 to 25 percent by mass.

Resin Dissolving Material

As the water-soluble low molecular weight compound having a solubility of more than 10 g in 100 g of water at 20° C., a resin dissolving material, which is one of an amide, a sulfur-containing solvent, and a cyclic ether, may be mentioned. Among those mentioned above, a resin dissolving material, which is one of an amide, a sulfur-containing solvent, and a cyclic ether, having a standard boiling point of 150° C. to 300° C. is preferably contained. In addition, the resin dissolving material is an organic compound which dissolves a resin and which has a function to improve the abrasion resistance; however, the function thereof is not limited to that described above.

As the amide described above, for example, there may be mentioned a cyclic amide (lactam), such as 2-pyrrolidone (2P), 2-pyperidone, ε-caprolactam (CPL), N-methyl-ε-caprolactam, N-cyclohexyl-2-pyrrolidone, N-methylpyrrolidone, N-ethylpyrrolidone, N-butylpyrrolidone, 5-methyl-2-pyrrolidone, β-propiolactam, or ω-heptalactam; or a chain amide, such as N,N-dimethylacetamide, N,N-diethylacetamide, N-methylacetoacetamide, N,N-dimethylisobutyramide, N,N-dimethylformamide, N,N-diethylformamide, N,N-dimethylacetamide, N,N-diethylacetamide, N,N-dimethylpropionamide, 3-methoxy-N,N-dimethylpropaneamide (DMPA), 3-n-butoxy-N,N-dimethylpropionamide, or 3-methoxy-N,N-diethylpropioneamide. Among those mentioned above, 2-pyrrolidone (2P), ε-caprolactam (CPL), or 3-methoxy-N,N-dimethylpropaneamide (DMPA) is more preferable, and the storage stability of the ink tends to be made more excellent.

As the sulfur-containing solvent, for example, there may be mentioned 3-methylsulfolane, sulfolane, ethyl isopropyl sulfone, ethyl methyl sulfone, dimethyl sulfone, dimethylsulfoxide (DMSO), diethylsulfoxide, tetramethylene sulfoxide, or methyl phenyl sulfoxide. Among those mentioned above, dimethylsulfoxide (DMSO) is more preferable, and the storage stability of the ink tends to be made more excellent.

As the cyclic ether described above, for example, there may be mentioned isosorbide dimethyl ether, 3-methyl-3-oxetanemethanol, 3-ethyl-3-oxetanemethanol (DMHD), 2-hydroxymethyloxetane, tetrahydrofurfuryl alcohol, solketal, glycerol formal, 1,4-dioxane-2,3-diol, or dihydrolevoglucosenone. Among those mentioned above, 3-ethyl-3-oxetanemethanol (DMHD) is more preferable, and the storage stability of the ink tends to be more excellent.

Among those mentioned above, a resin dissolving material which is an amide having a standard boiling point of 150° C. to 300° C. is preferable since the storage stability tends to be made more excellent. In addition, the resin dissolving material is preferably a compound having a melting point of 80° C. or less. When the melting point is in the range described above, the clogging recovery property tends to be made excellent.

As the water-soluble low molecular weight compound, the ink composition contains, with respect to the total mass of the ink composition, a resin dissolving material which is an amide, a sulfur-containing solvent, or a cyclic ether at a content of preferably 20 percent by mass or less, more preferably 15 percent by mass or less, even more preferably 10 percent by mass or less, and further preferably 5 percent by mass or less. In addition, a lower limit of the content described above is 0 percent by mass or more, preferably 1 percent by mass or more, more preferably 2 percent by mass or more, and further preferably 3 percent by mass or more.

In addition, the content of the resin dissolving material which is an amide, a sulfur-containing solvent, or a cyclic ether having a standard boiling point of 150° C. to 300° C. may be controlled in the range described above. When the content of the resin dissolving material is in the range described above, the solubility of the resin is improved in the ink composition, and the storage stability and the abrasion resistance tend to be made more excellent. On the other hand, when the content described above is more than the range described above, the storage stability may be degraded in some cases. The reason for this is believed that since the content of the water in the ink composition is relatively decreased, the resin is not likely to be dissolved.

Polyol and Glycol Ether

The ink composition may contain as the water-soluble low molecular weight compound other than the resin dissolving material described above, a compound which is a polyol or a glycol ether. In particular, a compound which is a polyol or a glycol ether having a standard boiling point of 150° C. to 250° C. is preferably contained.

Polyol

The polyol is preferably a glycol or a compound formed by intermolecular condensation between hydroxy groups of glycol molecules. In the case described above, the polyol is a compound having two hydroxy groups. In addition, as the polyol, there may be mentioned a compound in which at least one hydrogen atom of a glycol or a compound formed by intermolecular condensation between hydroxy groups of glycol molecules is replaced by at least one hydroxy group. In the case described above, the polyol is a compound having at least 3 hydroxy groups.

A glycol forming a polyol or a glycol unit in a compound formed by intermolecular condensation between hydroxy groups of glycol molecules has preferably 2 to 10 carbon atoms and more preferably 3 to 8 carbon atoms. In addition, the polyol has in its molecule, preferably 2 to 15 carbon atoms and more preferably 3 to 10 carbon atoms. In addition, the polyol preferably has a standard boiling point of 150° C. to 250° C.

As the polyol having a standard boiling point of 150° C. to 250° C., for example, there may be mentioned ethylene glycol (standard boiling point: 198° C., mixing with water), diethylene glycol (standard boiling point: 244° C., perfect mixing with water), 1,2-propanediol (propylene glycol) (standard boiling point: 188° C., perfect mixing with water), dipropylene glycol (standard boiling point: 227° C., perfect mixing with water), 1,2-butanediol (standard boiling point: 193° C., mixing with water), 1,2-pentanediol (standard boiling point: 210° C., mixing with water), 1,2-hexanediol (standard boiling point: 224° C., perfect mixing with water), 1,3-propanediol (standard boiling point: 214° C., perfect mixing with water), 1,4-butanediol (standard boiling point: 228° C., perfect mixing with water), 2,3-butanediol (standard boiling point: 177° C., mixing with water), 1,3-butylene glycol (standard boiling point: 207° C., perfect mixing with water), 3-methyl-1,3-butanediol (standard boiling point: 203° C., perfect mixing with water), 2-methyl-1,3-propanediol (standard boiling point: 214° C., perfect mixing with water), 2,2-dimethyl-1,3-propanediol (standard boiling point: 208° C., solubility: 83 [g/100 g of water]), 2-methylpentane-2,4-diol (standard boiling point: 197° C., perfect mixing with water), 2,5-dimethyl-2,5-hexanediol (standard boiling point: 218° C., solubility: 14 [g/100 g of water]), 1,5-pentanediol (standard boiling point: 242° C., mixing with water), 3-methyl-1,5-pentanediol (standard boiling point: 250° C., perfect mixing with water), or 1,6-hexanediol (standard boiling point: 250° C., mixing with water). As the polyol, a polyol having 10 carbon atoms or less is more preferable.

Among the polyols, an alkanediol having a standard boiling point of 150° C. to 250° C. and 10 carbon atoms or less is more preferable, and an alkanediol having a standard boiling point of 150° C. to 250° C. and 6 carbon atoms or less is further preferable. As the alkanediols as described above, for example, there may be mentioned a 1,2-alkanediol, such as ethylene glycol, propylene glycol, 1,2-propanediol, 1,2-butanediol, 1,2-pentanediol, or 1,2-hexanediol, 1,3-propanediol, or 1,3-butylene glycol.

The ink composition preferably contains as the water-soluble low molecular weight compound, an alkanediol having a standard boiling point of 150° C. to 250° C. and 6 carbon atoms or less at a content of 1 to 5 percent by mass with respect to the total mass of the ink composition.

Glycol Ether

The glycol ether is a compound in which at least one hydroxy group of a glycol is etherified. As the glycol ether described above, for example, a monoether or a diether of an alkylene glycol is preferable. As the etherified ether described above, an alkyl ether is preferable. An alkylene of an alkylene glycol or an alkyl of an alkyl ether, each of which forms the glycol ether, independently preferably has 1 to 5 carbon atoms and more preferably has 2 to 4 carbon atoms. The glycol ether also more preferably has a standard boiling point of 150° C. to 250° C.

As the glycol ether, for example, there may be mentioned an alkylene glycol monoalkyl ether, such as ethylene glycol monomethyl ether (perfect mixing with water), ethylene glycol monoethyl ether (mixing with water), ethylene glycol monoisopropyl ether (solubility: 100 [g/100 g of water]), ethylene glycol monopropyl ether (mixing with water), ethylene glycol monoisobutyl ether (solubility: 75.5 [g/100 g of water]), ethylene glycol mono-tert-butyl ether (mixing with water), ethylene glycol monobutyl ether (solubility: 100 [g/100 g of water]), diethylene glycol monomethyl ether (perfect mixing with water), or diethylene glycol monoethyl ether (perfect mixing with water).

In addition, compared to a monoether of the glycol ether mentioned above, a diether thereof tends to easily dissolve or swell the resin in the ink composition, and the abrasion resistance of the image to be formed is more preferably improved. On the other hand, the monoether described above is preferably superior in terms of wet spreadability of the ink composition.

The ink composition contains as the water-soluble low molecular weight compound, one of the polyol and the glycol ether at a content of preferably 30 percent by mass or less and more preferably 25 percent by mass or less with respect to the total mass of the ink composition. In addition, as a lower limit, the content described above with respect to the total mass of the ink composition is 0 percent by mass or more, preferably 10 percent by mass or more, and more preferably 15 percent by mass or more.

In addition, the content of the polyol or the glycol ether having a standard boiling point of 150° C. to 250° C. is preferably set in the range described above.

When at least one of those water-soluble low molecular weight compounds is contained in the range described above, the solubility of the resin is made more preferable, and the storage stability tends to be made more excellent.

1.1.2.3 Surfactant

The ink composition may contain a surfactant. Although the surfactant is not particularly limited, for example, an acetylene glycol-based surfactant, a fluorine-based surfactant or a silicone-based surfactant may be mentioned.

The silicone-based surfactant is not particularly limited, and a polysiloxane-based compound is preferably mentioned. Although the polysiloxane-based compound is not particularly limited, for example, a polyether modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or Silface SAG503A or Silface SAG014 (trade name, manufactured by Nissin Chemical Industry Co., Ltd.).

The surfactants mentioned above may be used alone, or at least two types thereof may be used in combination.

When the surfactant is contained, a content thereof with respect to the total mass of the ink composition is preferably set to 0.1 to 1.5 percent by mass.

In addition, among the surfactants described above, the content of the silicone-based surfactant or the fluorine-based surfactant is also preferably set in the range described above. Furthermore, among the surfactants described above, the content of the silicone-based surfactant is also preferably set in the range described above.

In general, when the silicone-based surfactant is contained in the ink composition, although the image quality tends to be further improved, the abrasion resistance and a defoaming property are liable to be degraded. However, in the ink composition according to this embodiment, even when the addition amount of the silicone-based surfactant is small as shown in the range described above, the image quality can be made excellent, and in addition, the abrasion resistance can also be made preferable.

1.1.2.4 Resin

The ink composition may also contain a resin. The resin can be blended as a water-soluble resin or an emulsion of resin particles. The resin as described above may function in some cases as a so-called fixing resin which improves the adhesion and the abrasion resistance of the components of a pigment ink adhered to a recording medium. As the resin, an emulsion of resin particles is preferable.

As the resin, for example, there may be mentioned a resin, such as an urethane-based resin, an acrylic-based resin, a fluorene-based resin, a polyolefin-based resin, a rosin-modified resin, a terpene-based resin, a polyester-based resin, a polyamide-based resin, an epoxy-based resin, a vinyl chloride-based resin, an ethylene-vinyl acetate-based resin, a vinyl acetate resin, a butadiene resin, a styrene resin, a cross-linked acrylic resin, a cross-linked styrene resin, a benzoguanamine resin, a phenol resin, a silicone resin, a paraffin resin, or a fluorine resin. In addition, although being frequently handled in the form of an emulsion, those resins each may also be in the form of a powder. In addition, the resins may be used alone, or at least two types thereof may be used in combination. Among those mentioned above, an urethane-based resin, an acrylic-based resin, or a polyolefin-based resin is preferable.

The urethane-based resin is a generic name of resins having an urethane bond. As the urethane-based resin, for example, there may be used a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond.

The acrylic-based resin is a generic name of polymers each obtained by polymerizing at least one acrylic-based monomer, such as (meth)acrylic acid or a (meth)acrylic acid ester, as one component, and for example, a resin obtained from an acrylic-based monomer or a copolymer obtained by copolymerization between an acrylic-based monomer and another monomer may be mentioned. For example, an acryl vinyl-based resin which is a copolymer between an acrylic-based monomer and a vinyl-based monomer may be mentioned. In addition, for example, a copolymer with a vinyl monomer, such as styrene, may be mentioned. As the acryl-based monomer, for example, acrylamide or acrylonitrile may also be used.

As a resin emulsion formed using an acrylic-based resin as a raw material, a commercial product may also be used, and for example, the commercial product selected from FK-854 (trade name, manufactured by Chuorika Kougyo Co., Ltd.); Movinyl 952B and 718A (trade name, manufactured by Nippon Synthetic Chemical Industry Co., Ltd.); and Nipol LX852 and LX874 (trade name, manufactured by Zeon Corporation); Polysol AT860 (manufactured by Showa Denko K.K.); and Voncoat AN-1190S, YG-651, AC-501, AN-1170, and 4001 (trade name, acrylic-based resin emulsion, manufactured by DIC Corporation) may also be used.

In addition, the acrylic-based resin may also include a styrene-acrylic-based resin as described above. In addition, in this specification, (meth)acryl indicates acryl or methacryl.

The styrene-acrylic-based resin is a copolymer obtained from a styrene monomer and an acrylic-based monomer, and for example, there may be mentioned a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer. As the styrene-acrylic-based resin, a commercial product may also be used, and for example, there may be mentioned Joncryl 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); or Movinyl 966A or 975N (trade name, manufactured by Nippon Synthetic Chemical Industry Co., Ltd.).

The vinyl chloride-based resin may also be a vinyl chloride-vinyl acetate copolymer.

The polyolefin-based resin is a resin having a structural skeleton of an olefin, such as ethylene, propylene, or butylene, and one appropriately selected from known polyolefin-based resins may be used. As the polyolefin-based resin, a commercial product may also be used, and for example, Arrowbase CB-1200 or CD-1200 (trade name, manufactured by Unitika Ltd.) may be selectively used.

In addition, the resin may be supplied in the form of an emulsion, and as an example of a commercial product of the resin emulsion as described above, for example, the commercial product may be selectively used from Microgel E-1002 and E-5002 (trade name, styrene-acrylic-based resin emulsion, manufactured by Nippon Paint Co., Ltd.); Voncoat AN-1190S, YG-651, AC-501, AN-1170, 4001, and 5454 (trade name, styrene-acrylic-based resin emulsion, manufactured by DIC Corporation); Polysol AM-710, AM-920, AM-2300, AP-4735, AT-860, and PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene/vinyl acetate resin emulsion), and Polysol PSASE-6010 (ethylene/vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), and Vinyblan 5202 (acetic acid-acrylic resin emulsion) (trade name, manufactured by Nissin Chemical Industry Co., Ltd.); Vinyblan 700 and 2586 (manufactured by Nissin Chemical Industry Co., Ltd.); Elitel KA-5071S, KT-8803, KT-9204, KT-8701, KT-8904, and KT-0507 (trade name, polyester resin emulsion, manufactured by Unitika Ltd.); Hitech SN-2002 (trade name, polyester resin emulsion, manufactured by Toho Chemical Industry Co., Ltd.); Takelac W-6020, W-635, w-6061, W-605, W-635, and W-6021 (trade name, urethane-based resin emulsion, manufactured by Mitsui Chemicals Polyurethane); NK Binder R-5HN (manufactured by Shin-Nakamura Chemical Co., Ltd.); Hydran WLS-210 (non-cross-linked polyurethane, manufactured by DIC Corporation); and Joncryl 7610 (manufactured by BASF).

Among those resins mentioned above, an acrylic-based resin is preferable, and a styrene-acrylic-based resin is more preferable. When the resin is as described above, the abrasion resistance tends to be made more excellent.

In addition, a glass transition temperature (Tg) of the resin is preferably 60° C. or more, more preferably 70° C. or more, even more preferably 80° C. or more, and further preferably 90° C. or more. On the other hand, the glass transition temperature described above is preferably 120° C. or less, more preferably 115° C. or less, even more preferably 110° C. or less, and further preferably 105° C. or less. When the glass transition temperature (Tg) of the resin is in the range described above, banding unevenness can be further suppressed, and the abrasion resistance may be made more excellent in some cases.

In addition, the glass transition temperature (Tg) of the resin can be confirmed by a general method using a differential scanning calorimeter (DSC) analysis or the like.

A content of the resin with respect to the total mass of the ink composition is as a solid content, preferably 0.1 to 20 percent by mass, more preferably 1.0 to 15.0 percent by mass, even more preferably 2.0 to 10.0 percent by mass, and further preferably 3.0 to 8.0 percent by mass.

Wax

The ink composition may also contain a wax. As the wax, for example, a wax dissolved in the ink or a wax dispersed in the form of fine particles, such as an emulsion, may be mentioned. Since the wax as described above is used, a recorded matter having a more excellent abrasion resistance tends to be obtained. In particular, since the wax is present on the surface of an ink coating film on the recording medium, that is, is localized at the interface between air and the ink coating film, the abrasion resistance tends to be improved thereby.

Although the wax as described above is not particularly limited, for example, there may be mentioned an ester wax between a higher aliphatic acid and a higher monovalent or divalent alcohol, a paraffin wax, a microcrystalline wax, a polyolefin wax, or a mixture of those mentioned above.

As the polyolefin wax, for example, a wax manufactured from an olefin, such as ethylene, propylene, or butylene, or a derivative thereof or a copolymer thereof may be mentioned, and in particular, for example, a polyethylene-based wax, a polypropylene-based wax, or a polybutylene-based wax may be mentioned. As the polyolefin wax, a commercial product may also be used, and in particular, Nopcoat PEM17 (trade name, manufactured by San Nopco Ltd.), Chemipal W4005 (trade name, manufactured by Mitsui Chemicals, Inc.), AQUACER 515 or AQUACER 593 (trade name, manufactured by BYK Japan KK), or Hitech E-6500 (polyethylene wax, manufactured by Toho Chemical Industry Co., Ltd.) may be used.

When the wax is contained, a content thereof with respect to the total mass of the ink composition is preferably 0.1 to 5 percent by mass, more preferably 0.2 to 4 percent by mass, and further preferably 0.3 to 3 percent by mass. When the content of the wax is in the range described above, the abrasion resistance is preferably improved, and while the viscosity of the ink is maintained low, the ejection stability and the clogging recovery property preferably tend to be made excellent.

1.1.2.5 Other Materials

The ink composition may contain, if needed, various types of additives, such as a chelating agent, an antirust agent, a fungicide, an antioxidant, a reduction inhibitor, and/or an evaporation accelerator.

1.1.3. Preparation and Physical Properties of Ink Composition

The ink composition can be obtained in such a manner that the components described above are mixed together in an arbitrary order, and if needed, impurities are then removed by filtration or the like. As a mixing method of the components, a method in which after raw materials are sequentially added in a container equipped with a stirring device, such as a mechanical stirrer or a magnetic stirrer, stirring and mixing are performed is preferably used. As a filtration method, for example, a centrifugal filtration or a filter filtration may be performed, if needed.

In view of the balance between the image quality and the reliability as the ink jet recording ink, a surface tension (static surface tension) of the ink composition at 20° C. is preferably 18 to 40 mN/m, more preferably 20 to 35 mN/m, and further preferably 22 to 33 mN/m. In addition, the measurement of the surface tension can be performed such that using an automatic surface tensiometer CBVP-Z (trade name, manufactured by Kyowa Interface Science Co., Ltd.) or the like, a surface tension when a platinum plate is wetted with an ink in an environment at 20° C. is confirmed.

From the same point as described above, the viscosity of the ink at 20° C. is preferably 3 to 10 mPa·s and more preferably 3 to 8 mPa·s. In addition, the viscosity can be measured in an environment at 20° C. using a viscoelastic tester MCR-300 (trade name, manufactured by Pysica) or the like.

Because of the aggregating agent contained in the treatment liquid which will be described below, the ink composition receives the actions of aggregation of the components and viscosity increase of the composition. The viscosity of the ink composition is preferably increased by the treatment liquid described below. Although the degree of the increase in viscosity in this case is not particularly limited, a viscosity increase rate obtained from the change in viscosity before and after the ink composition and the treatment liquid described later are mixed at a mass ratio:(ink composition: treatment liquid)=(10:1) is preferably 2.0 times or more, more preferably 2.5 times or more, even more preferably 4.0 times or more, and further preferably 5.5 times or more. An upper limit of the viscosity increase rate is not particularly limited, and the upper limit described above is preferably 10 times or less and more preferably 8 times or less. When the viscosity increase rate is in the range described above, an image having a more preferable image quality can be obtained.

1.2. Treatment Liquid

The treatment liquid contains an aggregating agent.

1.2.1. Aggregating Agent

The treatment liquid contains an aggregating agent to aggregate the components of the ink composition described above. In addition, the aggregating agent has a function to increase the viscosity of the ink composition described above. Since the treatment liquid contains the aggregating agent, in the main scanning described later, the colorant, the resin, and the like contained in the ink composition react with the aggregating agent on the recording medium. Accordingly, since the dispersion state of the colorant and the resin in the ink composition is destroyed, and the components described above are aggregated, for example, the permeation of the colorant in the recording medium is inhibited, and/or the increase in viscosity of the ink composition occurs. Hence, it is believed that the image quality (in terms of bleeding unevenness and color development property) of the image thus obtained is made excellent.

As the aggregating agent, for example, there may be mentioned a polyvalent metal salt, a cationic compound, such as a cationic resin or a cationic surfactant, or an organic acid. Those aggregating agents may be used alone, or at least two types thereof may be used in combination. Among the aggregating agents mentioned above, in terms of excellent reactivity with the components contained in the ink composition, at least one aggregating agent selected from the group consisting of a polyvalent metal salt, an organic acid, and a cationic resin is preferably used.

As the polyvalent metal salt, there may be mentioned a water-soluble compound formed from an at least divalent polyvalent metal ion and an anionic ion to be bound thereto. As a concrete example of the polyvalent metal ion, for example, there may be mentioned a divalent metal ion, such as $Ca^{2+}$, $Cu^{2+}$, $Ni^{2+}$, $Mg^{2+}$, $Zn^{2+}$, or $Ba^{2+}$, or a trivalent metal ion, such as $Al^{3+}$, $Fe^{3+}$, or $Cr^{3+}$. As the anionic ion, for example, there may be mentioned $Cl^-$, $I^-$, $Br^-$, $SO_4^{2-}$, $Clo^{3-}$, $NO^{3-}$, $HCOO^-$, or $CH_3COO^-$. Among those polyvalent metal salts, in view of stability of the treatment liquid and reactivity as the aggregating agent, a calcium salt or a magnesium salt is preferable.

As the organic acid, for example, there may be mentioned a poly(acrylic acid), formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivative or a salt of at least one of those mentioned above. The organic acid may be used alone, or at least two types thereof may be used in combination. An organic acid salt which is also a polyvalent metal salt is included in the polyvalent metal salt in this specification.

As the cationic resin, for example, there may be mentioned a cationic urethane resin, a cationic olefin resin, or a cationic amine-based resin may be mentioned. The cationic amine-based resin may be a resin having an amine group, and for example, an allylamine resin, a polyamine resin, a quaternary ammonium salt polymer, or a polyamide resin may be mentioned. As the polyamine resin, a resin having an amino group in its main skeleton may be mentioned. As the allylamine resin, a resin having an allyl group in its main skeleton may be mentioned. As the quaternary ammonium salt polymer, a resin having a quaternary ammonium salt in its structure may be mentioned. As the polyamide resin, a resin having an amide group in its main skeleton and an amino group on its side chain may be mentioned. Among the cationic resins, since not only being excellent in reactivity but also being easily available, the cationic amine-based resin is preferable.

Among those mentioned above by way of example, the aggregating agent is more preferably selected from the polyvalent metal salts. Accordingly, an image having a more preferable image quality can be obtained.

A concentration of the aggregating agent in the treatment liquid with respect to a total mass of the treatment liquid is preferably 0.5 percent by mass or more, more preferably 1 percent by mass or more, and further preferably 3 percent by mass or more. In addition, the concentration of the aggregating agent in the treatment liquid with respect to the total mass of the treatment liquid is preferably 20 percent by mass or less, more preferably 15 percent by mass or less, and further preferably 10 percent by mass or less.

1.2.2. Other Components

Besides the aggregating agent, the treatment liquid may also contain water, a water-soluble low molecular weight organic compound, a surfactant, at least one of other additives, and/or the like. Since the components of those mentioned above, the contents thereof with respect to the treatment liquid, and the like are similar to those of the ink composition described above, description thereof will be omitted. In addition, the treatment liquid may also contain, besides the aggregating agent, components which may be contained in the ink composition other than the colorant, and for example, the contents and the characteristics of the above components may be determined independently of those contained in the ink composition described above. In addition, in the treatment liquid, the content of the colorant described above is preferably 0.2 percent by mass or less, more preferably 0.1 percent by mass or less, and further preferably 0.05 percent by mass or less, and a lower limit thereof is 0 percent by mass.

1.2.3. Preparation and Physical Properties of Treatment Liquid

The treatment liquid according to this embodiment can be manufactured by dispersing and mixing the components described above using an appropriate method. After the components described above are sufficiently stirred, coarse particles and foreign substances to cause clogging are removed by filtration, so that a desired treatment liquid can be obtained.

When the treatment liquid according to this embodiment is ejected by an ink jet head, the surface tension thereof at 25° C. is preferably 18 to 40 mN/m, more preferably 20 to 35 mN/m, and further preferably 22 to 33 mN/m. In addition, the surface tension can be measured using an automatic surface tensiometer CBVP-Z (trade name, manufactured by Kyowa Interface Science Co., Ltd.) or the like in such a manner that the surface tension is confirmed when a platinum plate is wetted with the treatment liquid in an environment at 25° C.

In addition, from the same point as described above, the treatment liquid has a viscosity at 25° C. of preferably 3 to 10 mPa·s and more preferably 3 to 8 mPa·s. In addition, the viscosity can be measured in an environment at 25° C. using a viscoelastic tester MCR-300 (trade name, manufactured by Pysica) or the like.

1.3. Recording Medium

A recording medium to form an image by the recording method according to this embodiment may either have or not have a recording surface to absorb a liquid such as an ink composition. Hence, the recording medium is not particularly limited, and for example, there may be mentioned a liquid absorbing recording medium, such as paper or a cloth, a liquid low-absorbing recording medium, such as printing paper, or a liquid non-absorbing recording medium, such as a metal, a glass, a film, or a high molecular weight material. However, excellent effects of the recording method of this embodiment can be made more significant when an image is recorded on a liquid low-absorbing or a liquid non-absorbing recording medium. That is, according to the recording method of this embodiment, even if a liquid low-absorbing or a liquid non-absorbing recording medium relatively liable to cause aggregation unevenness is used, a high quality image having a preferable abrasion resistance can be formed.

The liquid low-absorbing or the liquid non-absorbing recording medium indicates a recording medium which hardly absorbs a liquid or which absorbs no liquid at all, respectively. In a quantitative point of view, the liquid non-absorbing or the liquid low-absorbing recording medium indicates "a recording medium having a water absorption amount of 10 mL/$m^2$ or less from a contact start to 30 mseconds$^{1/2}$ measured by Bristow method". This Bristow method is the most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the liquid absorbing recording medium indicates a recording medium corresponding to neither the liquid non-absorbing recording medium nor the liquid low-absorbing recording medium. In this specification, the liquid low-absorbing recording medium and the liquid non-absorbing recording medium may be simply called a low-absorbing recording medium and a non-absorbing recording medium, respectively.

As the liquid non-absorbing recording medium, for example, there may be mentioned a film or a plate formed from a plastic, such as a poly(vinyl chloride), a polyethylene, a polypropylene, or a poly(ethylene terephthalate) (PET); a plate formed from a metal, such as iron, silver, copper, or aluminum; a metal plate or a plastic-made film manufactured by deposition of at least one of the metals mentioned above; or a plate formed from an alloy, such as stainless steel or brass. In addition, for example, there may also be mentioned a plastic coated on a substrate formed from paper or the like, a plastic film adhered to a substrate formed from paper or the like, or a plastic film having no absorbing layer (receiving layer). As the plastic described above, for example, a poly(vinyl chloride), a poly(ethylene terephthalate), a polycarbonate, a polystyrene, a polyurethane, a polyethylene, or a polypropylene may be mentioned.

In addition, as the liquid low-absorbing recording medium, for example, a recording medium in which a low-absorbing coating layer is provided on a substrate surface may be mentioned. As a medium including paper as a substrate, for example, printing paper, such as art paper, coated paper, or cast paper, may be mentioned, and as a medium including a plastic film as a substrate, for example, there may be mentioned a medium in which a hydrophilic polymer is coated on a surface of a poly(vinyl chloride), a poly(ethylene terephthalate), a polycarbonate, a polystyrene, a polyurethane, a polyethylene, or a polypropylene or a medium in which particles, such as silica and/or titanium, are coated with a binder on the surface of one of those mentioned above.

The liquid absorbing recording medium is not particularly limited, and for example, there may be mentioned regular paper, such as electrophotographic paper, having a high liquid permeability or ink jet paper (ink jet exclusive paper including an ink absorbing layer formed from silica particles or aluminum particles or an ink absorbing layer formed from a hydrophilic polymer, such as a poly(vinyl alcohol) (PVA) or a poly(vinyl pyrrolidone) (PVP)). Furthermore, as the liquid absorbing recording medium, a cloth or a non-woven cloth may also be mentioned by way of example.

In addition, the recording medium may be colorless transparent, translucent, colored transparent, chromatic opaque, achromatic opaque, or the like. In addition, the recording medium itself may be colored or may be translucent or transparent.

Among the media described above by way of example, the recording medium is more preferably a low-absorbing recording medium or a non-absorbing recording medium. Accordingly, the effects of the present disclosure can be more sufficiently obtained. That is, since the ink composition is not likely to wet and spread on those recording media as described above, the bleeding unevenness is particularly liable to be generated. In addition, the solvent components are liable to be evaporated, for example, from the ink which stays on the surface of the recording medium without being absorbed therein, and the dew condensation is liable to occur. According to the recording method of this embodiment, even if the recording medium as described above is used, recording capable of significantly reducing the bleeding unevenness and the dew condensation one the head can be performed.

1.4. Recording Apparatus

One example of an ink jet recording apparatus which can be preferably used to carry out the recording method according to this embodiment will be describe with reference to the drawings.

Schematic Apparatus Structure

FIG. 1 is a schematic cross-sectional view showing an ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes a recording head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. In the ink jet recording apparatus 1, all operations thereof are controlled by the control portion CONT shown in FIG. 2.

Structure of Recording Head

The recording head 2 has a structure to perform recording on a recording medium M by ejecting the ink from a nozzle of the recording head 2 so as to be adhered thereto. The treatment liquid can also be adhered in a manner similar to that described above. The recording head 2 shown in FIGS. 1 and 2 is a serial type recording head and is configured to adhere the ink and the treatment liquid to the recording medium M by at least two scannings performed in a main scanning direction relative to the recording medium M. The recording head 2 is mounted on the carriage 9 shown in FIG. 2. The recording head 2 is scanned at least two times in the main scanning direction relative to the recording medium M by the operation of the carriage transfer mechanism 13 to transfer the carriage 9 in a medium width direction of the recording medium M. The medium width direction is the main scanning direction of the recording head 2. The scanning in the main scanning direction is also called a main scanning.

In addition, the main scanning direction is a direction in which the carriage 9 mounting the recording head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is the main scanning direction MS, and a direction represented by T1-T2 is the sub-scanning direction SS. In addition, by one scanning, the scanning is performed in the main scanning direction, that is, in one direction represented by an arrow S1 or an arrow S2. In addition, since the main scanning of the recording head 2 and the sub-scanning which is the transport of the recording medium M are each repeatedly performed at least two times, the recording is performed on the recording medium M.

A cartridge 12 to supply the ink and the treatment liquid to the recording head 2 includes a plurality of independent cartridges. The cartridge 12 is detachably fitted to the carriage 9 mounting the recording head 2. In the respective cartridges, different types of inks and different types of treatment liquids can be filled, and the inks and the treatment liquids are supplied to respective nozzles from the cartridge 12. In addition, although an example in which the cartridge 12 is fitted to the carriage 9 is shown in FIGS. 1 and 2, the cartridge 12 is not limited thereto and may be provided at a position other than that of the carriage 9 so that the inks and the treatment liquids are each supplied to the nozzle by a supply tube not shown.

The ejection from the recording head 2 may use a method known in the past. In this embodiment, a method in which liquid droplets are ejected using vibration of a piezoelectric element, that is, an ejection method in which for example, ink droplets are formed by mechanical deformation of an electrostrictive element, is used.

Primary Drying Mechanism

In order to promote drying of the recording medium M when the ink and the treatment liquid are ejected from the recording head 2 and then adhered to the recording medium, the ink jet recording apparatus 1 may include a primary drying mechanism. The primary drying mechanism may use a conduction method, a ventilation method, a radiation method, and/or the like. The conduction method is a method to conduct heat to the recording medium from a member in contact therewith. For example, the platen heater may be mentioned.

The ventilation method is a method to dry the ink and the like by sending an ordinary temperature wind or a hot wind to the recording medium. For example, a ventilation fan may be mentioned. In addition, there may be provided various types of fans (such as the ventilation fan to dry the ink and the like on the recording medium M by sending a hot wind or a wind having the same temperature as that in the environment to the recording medium M. A primary drying step performed by the ventilation method is a ventilation step which will be described later. The primary drying mechanism to perform the ventilation is a ventilation mechanism to perform the ventilation step.

The radiation method is a method to heat the recording medium by emitting radioactive rays which generates heat to the recording medium. For example, IR radiation may be mentioned. In addition, although not shown in the drawing, a heater similar to the platen heater may be provided right downstream of the platen heater 4 in the SS direction. Those primary drying mechanisms may be used alone, or at least two types thereof may be used in combination. For example, as the primary drying mechanism, the IR heater 3 and the platen heater 4 are provided.

In addition, when the IR heater 3 is used, the recording medium M can be heated using a radiation method to radiate infrared rays from a recording head 2 side. Accordingly, although the recording head 2 is also liable to be simultaneously heated, compared to the case in which heating is performed from a rear surface of the recording medium M by the platen heater 4 or the like, the temperature can be increased without receiving the influence of the thickness of the recording medium M.

The platen heater 4 is able to heat the recording medium M at a position facing the recording head 2 with the platen 11 interposed therebetween. The platen heater 4 is able to heat the recording medium M by a conduction method, and in the ink jet recording method, the platen heater 4 is used, if needed.

In addition, the ink jet recording apparatus 1 may include the pre-heater 7 to heat the recording medium M in advance before the ink and/or the treatment liquid is adhered to the recording medium M.

Post Heating Mechanism (Secondary Drying Step)

After a treatment liquid adhesion step, a first ink adhesion step, and a second ink adhesion step are performed, a post heating mechanism (secondary drying step) to dry and fix the ink and the like by heating the recording medium may be included.

The heating heater 5 used for the post heating mechanism is a heater to dry and fix the ink and the like adhered to the recording medium M. Since the heating heater 5 heats the recording medium M on which an image is recorded, for example, moisture contained in the ink and/or the treatment liquid is more rapidly evaporated and scattered, and an ink film is formed from the resin contained in the ink. As described above, since the ink film is tightly fixed or adhered onto the recording medium M, a film forming property is made excellent, and an image having an excellent high quality can be obtained in a short time.

Other Structures

The ink jet recording apparatus 1 may also include the cooling fan 6. After the ink and the like recorded on the recording medium M are dried, since the ink on the recording medium M is cooled by the cooling fan 6, the ink coating film can be formed on the recording medium M with good adhesion.

Under the carriage 9, the platen 11 to support the recording medium M, the carriage transfer mechanism 13 to transfer the carriage 9 relative to the recording medium M, and the transport device 14 which is a roller to transport the recording medium M in the sub-scanning direction are provided. The operations of the carriage transfer mechanism 13 and the transport device 14 are controlled by the control portion CONT.

Electric Control

FIG. 3 is a functional block diagram of the ink jet recording apparatus 1. The control portion CONT is a control unit to control the ink jet recording apparatus 1. An interface portion 101 (I/F) functions to send and receive data between a computer 130 (COMP) and the ink jet recording apparatus 1. A CPU 102 is an arithmetic processing device to control the entire ink jet recording apparatus 1. A memory 103 (MEM) is to secure, for example, a region in which a program of the CPU 102 is stored and an operation region thereof. The CPU 102 controls individual units by a unit control circuit 104 (UCTRL). In addition, the status in the ink jet recording apparatus 1 is monitored by a detector group 121 (DS), and based on the detection result thereof, the control portion CONT controls the individual units.

A conveyer unit 111 (CONVU) is a unit to control the sub-scanning (transport) of the ink jet recording and, in particular, is a unit to control a transport direction and a transport rate of the recording medium M. Furthermore, in more particular, by controlling a rotation direction and a rotation rate of a transport roller driven by a motor, the transport direction and the transport rate of the recording medium M are controlled.

A carriage unit 112 (CARU) is a unit to control the main scanning (pass) of the ink jet recording and, in particular, is a unit to reciprocally transfer the recording head 2 in the main scanning direction. The carriage unit 112 includes the carriage 9 mounting the recording head 2 and the carriage transfer mechanism 13 to reciprocally transfer the carriage 9.

A head unit 113 (HU) is a unit to control the ejection amounts of the ink and the treatment liquid from the nozzles of the recording head 2. For example, when the nozzle of the recording head 2 is driven by a piezoelectric element, the operation of the piezoelectric element of each nozzle is controlled. By the head unit 113, for example, an adhesion timing of each of the inks and the treatment liquid and a dot size thereof are controlled. In addition, by combination of the controls of the carriage unit 112 and the head unit 113, the adhesion amount of the ink or the treatment liquid per one scanning is controlled.

A drying unit 114 (DU) controls the temperatures of various types of heaters, such as the IR heater 3, the pre-heater 7, the platen heater 4, and the heating heater 5.

In the ink jet recording apparatus 1 described above, an operation to transfer the carriage 9 mounting the recording head 2 in the main scanning direction and a transport operation (sub-scanning) are alternately and repeatedly performed. In the case described above, when each pass is performed, the control portion CONT controls the carriage unit 112 such that the recording head 2 is transferred in the main scanning direction and also controls the head unit 113 such that liquid droplets of the ink and/or the treatment liquid are ejected from predetermined nozzle holes of the recording head 2, so that the liquid droplets of the ink and/or the treatment liquid are adhered to the recording medium M. In addition, the control portion CONT controls the conveyer unit 111 such that when the transport operation is performed, the recording medium M is transported by a predetermined transport amount (feed amount) in the transport direction.

In the ink jet recording apparatus 1, since the main scanning (pass) and the sub-scanning (transport operation) are repeatedly performed, a recording region to which a plurality of liquid droplets is adhered is gradually transported. In addition, by the heating heater 5, the liquid droplets adhered to the recording medium M are dried, so that an image is completed. Subsequently, the recorded matter thus completed may be wound in the form of a roller by a winding mechanism or may be transported by a flat bed mechanism.

1.5. Main Scanning and Sub-Scanning

The recording method of this embodiment includes a main scanning (step). In the main scanning, while the ink jet head is transferred with respect to the recording medium, the ink composition and the treatment liquid are ejected from the ink jet head and then adhered to the recording medium. In addition, the recording method of this embodiment includes a sub-scanning (step). The sub-scanning transports the recording medium in the sub-scanning direction intersecting the direction of the main scanning.

In addition, in the main scanning, a ventilation step of sending a wind to the recording medium is performed. The ventilation step will be described later. Furthermore, when the main scanning is performed, the recording medium to which the ink composition and the treatment liquid are adhered has a surface temperature of 33° C. or less.

When the recording medium is heated (primary heating step) at which the ink composition is adhered thereto, the drying of the ink composition is promoted, and the fluidity of the ink composition can be decreased at an early stage. In addition, since the treatment liquid is used, an image having an excellent image quality can be expected to be obtained. However, when the main scanning is performed, if the surface temperature of the recording medium to which the ink composition and the treatment liquid are adhered is more than 33° C., since the nozzle receives heat, the ejection stability may be degraded in some cases, and in addition, since the dew condensation occurs on a nozzle surface by the solvent component evaporated from the ink composition and the like, the ejection stability of the nozzle may be degraded in some cases.

On the other hand, when the primary heating step is not performed, an image having an excellent image quality cannot be always obtained. Instead of the heating, when the ventilation step is used to promote the drying of the ink composition by sending a wind to a portion of the recording medium to which the ink composition is adhered, an image having an excellent image quality can be obtained. That is, the heating may be not performed, or even if the heating is performed, a low-temperature heating may only be performed so that the surface temperature of the recording medium is not more than 33° C. Alternatively, the ventilation step may be performed with a hot wind so that the surface temperature of the recording medium is not more than 33° C. However, even when the ventilation step as described above is used, compared to the heating, the image quality may be slightly inferior in some cases. In particular, when the treatment liquid and the ink composition are simultaneously ejected all over the region of the image, only by performing the ventilation step, the image quality cannot be made sufficient in some cases.

According to the recording method of this embodiment, in the main scanning, by a portion of the ink jet head to eject the ink composition and the treatment liquid located upstream in the sub-scanning direction, the ink composition and the treatment liquid are overlapped and adhered to the same main scanning region of the recording medium by the same main scanning. Furthermore, in the main scanning, by a portion of the ink jet head to eject the ink composition and the treatment liquid located downstream in the sub-scanning direction, the ink composition is adhered to the recording medium, and when the ink composition is adhered thereto, the treatment liquid is not overlapped and adhered to the same main scanning region of the recording medium by the same main scanning.

Figure 4:
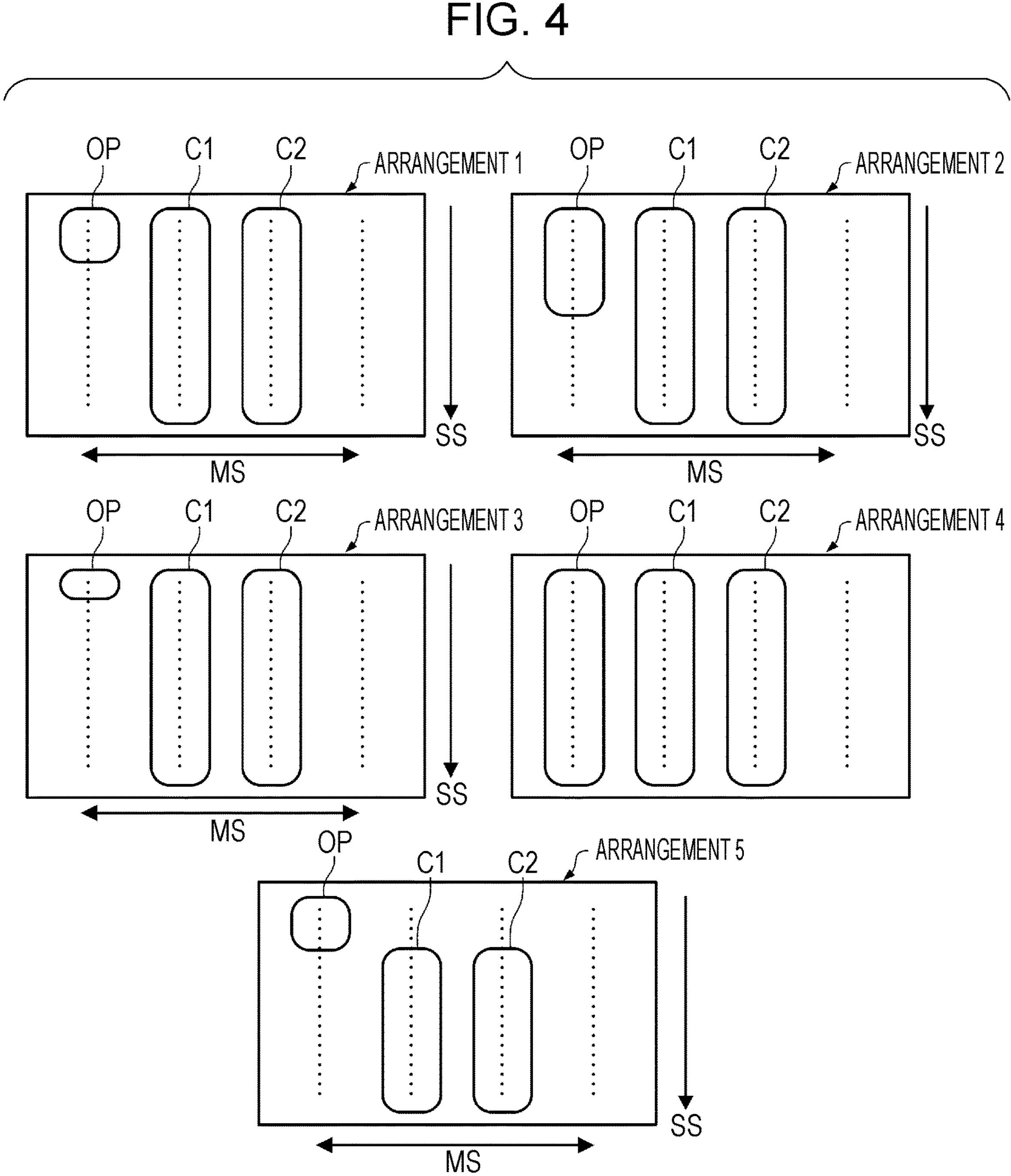
FIG. 4 is a schematic view showing arrangements and ejections of nozzle lines of ink jet heads used in Examples, Comparative Examples, and Reference Examples.

The arrangement of the ink jet head to perform the main scanning as described above will be described with reference to FIG. 4. FIG. 4 is a schematic view showing arrangements and ejections of nozzle lines of the ink jet heads used in Examples, Comparative Examples, and Reference Examples. FIG. 4 is a schematic view of a nozzle forming surface of the ink jet head. In FIG. 4, the main scanning direction MS and the sub-scanning direction SS are shown by the arrows. In addition, in FIG. 4, four nozzle lines extending in the sub-scanning direction SS are each shown by a dotted line.

Hereinafter, "arrangement 1" in FIG. 4 will be mainly described. The four nozzle lines include, from the left to the right side, a nozzle line capable of ejecting the treatment liquid, a nozzle line capable of ejecting the ink composition, a nozzle line capable of ejecting the ink composition, and a nozzle line not ejecting the ink composition. In addition, the state is shown such that the treatment liquid is to be ejected from a region OP surrounded by the solid line, and the ink compositions are to be ejected from regions C1 and C2 each surrounded by the solid line.

The respective liquids are configured so as to be ejected from the regions surrounded by the solid lines, and the state described above may be formed, for example, by an electric control or by the change in nozzle arrangement. For example, in the ink jet head, a nozzle line to eject the treatment liquid may be not provided at a position located upstream than a nozzle line to eject the ink composition in the sub-scanning direction. According to the case of the arrangement 1, in the regions C1 and C2, the ink composition is ejected from all the nozzles of each nozzle line, and in the region OP, the treatment liquid is ejected only from nozzles in a region having one-fourth length of the nozzle line located upstream in the recording medium transport direction (sub-scanning direction SS).

In the arrangement 1, in the main scanning, from the one-fourth regions of the nozzle lines located upstream in the sub-scanning direction SS, the treatment liquid and the ink composition are simultaneously ejected to the same main scanning region of the recording medium. Subsequently, the recording medium is transported by the sub-scanning only by the one-fourth length of the nozzle line in the sub-scanning direction SS, and a second main scanning is then performed. Accordingly, in a new region of the recording medium thus transported, by the one-fourth regions of the nozzle lines located upstream in the sub-scanning direction, the treatment liquid and the ink composition are simultaneously ejected to the same main scanning region of the recording medium. In the second main scanning, to the main scanning region of the recording medium to which the treatment liquid and the ink composition are adhered by the first main scanning, the ink composition is only adhered, and by the second main scanning, the treatment liquid is not overlapped and adhered to the same main scanning region of the recording medium described above.

In the arrangement 1, when the main scanning is performed 4 times in a manner similar to that described above, an image is formed on the recording medium. In the image thus formed, only by the first main scanning, the treatment liquid is adhered to the recording medium, and subsequently, the ink composition is only adhered. In other words, according to the arrangement 1, only when the lowest layer (layer closest to the recording medium) of the image formed from four layers is formed, the treatment liquid is adhered, and when the second, the third, and the fourth layers are formed, the ink composition is only adhered, so that the image is formed.

In addition, in the case in which the distance of the sub-scanning is set to one-eighth of the length of the nozzle line, when the main scanning is performed 8 times, an image is formed on the recording medium. In the image thus formed, only by the first two main scannings, the treatment liquid is adhered to the recording medium, and subsequently, the ink composition is only adhered thereto.

As described above, when the distance of the sub-scanning is changed, the number of main scannings is changed, and only by the first some main scannings, the treatment liquid is adhered to the recording medium, and subsequently, the ink composition is only adhered thereto. The length of the region OP in the sub-scanning direction is preferably set to the distance of the sub-scanning or more.

According to the case of the arrangement 2, the length of the region OP in the sub-scanning direction is one-half of the length of the region C1 in the sub-scanning direction. In this case, when the distance of the sub-scanning is set to one-half of the length of the nozzle line, and the main scanning is performed two times, an image is formed on the recording medium such that only by the first main scanning, the treatment liquid can be adhered to the recording medium. In addition, the distance of the sub-scanning can also be made shorter than the one-half of the length of the nozzle line.

According to the case of the arrangement 3, the length of the region OP in the sub-scanning direction is one-eighth of the length of the region C1 in the sub-scanning direction. In this case, when the distance of the sub-scanning is set to one-eighth of the length of the nozzle line, and the main scanning is performed eight times, an image is formed on the recording medium such that only by the first main scanning, the treatment liquid can be adhered to the recording medium. In addition, the distance of the sub-scanning can also be made shorter than the one-eighth of the length of the nozzle line.

On the other hand, according to the case of the arrangement 4, the region OP is present with respect to all the range of the region C1 in the sub-scanning direction. Accordingly, the main scanning cannot be performed such that when the ink composition is adhered, the treatment liquid is not overlapped and adhered to the same main scanning region of the recording medium by the same main scanning; hence, the case described above is not included this embodiment.

In addition, according to the case of the arrangement 5, the region OP is not present with respect to any range of the region C1 in the sub-scanning direction. Accordingly, the main scanning is not performed such that the ink composition and the treatment liquid are overlapped and adhered to the same main scanning region of the recording medium by the same main scanning, and hence, the case described above is not included in this embodiment. In the case as described above, since the length of the region C1 in the sub-scanning direction is decreased, the recording rate is made low, or the length of the whole ink jet head in the sub-scanning direction is increased.

Although no heating is performed in the main scanning, the image recorded in this embodiment has an excellent image quality. Under the same condition in which the adhesion amount of the treatment liquid is not changed, compared to the perfect simultaneous ejection as shown in the arrangement 4 in FIG. 4, since the number of liquid droplets of the treatment liquid by the portion of the ink jet head located upstream is larger, a contact rate thereof with the liquid droplets of the ink composition is high, and hence, the image quality can be made excellent. In addition, at the downstream of the ink jet head, since the ink composition is only adhered to the portion to which the treatment liquid is already adhered, the treatment liquid thus already adhered and the ink composition can react with each other.

On the other hand, when the aggregating agent contained in the treatment liquid remains in the image, the whitening thereof may occur in some cases in such a manner that the image looks white and cloudy. The reason for this is believed that lumps (crystals or the like) of the aggregating agent look white. Although depending on the concentration and the type of aggregating agent contained in the treatment liquid, the phenomenon as described above has been understood such that when the addition amount of the treatment liquid is not changed, and the liquid droplets of the treatment liquid have a high density when being adhered, the whitening is liable to occur. The reason for this is believed that when the density of the liquid droplets of the treatment liquid is high, the liquid droplets gather together, and the lumps of the aggregating agent are liable to be formed.

When the portion of the ink jet head at which the simultaneous ejection is performed with the treatment liquid is smaller, the treatment liquid is adhered to the recording medium at an earlier stage, and hence, the image has an excellent image quality. On the other hand, when the portion of the ink jet head at which the simultaneous ejection is performed with the treatment liquid is larger, reduction in whitening can be made more excellent.

For example, by a portion of the ink jet head to eject the ink composition and the treatment liquid, the portion being in an area of one-eighth to one-half of the ink jet head located upstream in the sub-scanning direction, the ink composition and the treatment liquid may be overlapped and adhered to the same main scanning region of the recording medium by the same main scanning.

In addition, the number of main scannings performed on the same main scanning region of the recording medium is preferably 20 times or less. Accordingly, a preferable image quality of the image, the reduction in whitening, and the improvement in recording rate can be more preferably obtained with good balance.

The same main scanning region is a rectangular region which has a length of one sub-scanning in the sub-scanning direction and which is extended in the main scanning direction.

The number of main scannings is 2 or more, preferably 3 to 20, even more preferably 4 to 15, further preferably 6 to 10, and particularly preferably 8 to 9.

The number of main scannings is called the main scanning number, the pass number, or the like.

The whitening is believed to relate to a use frequency of the nozzles to eject the treatment liquid. The whitening also relates to the adhesion amount of the treatment liquid and the length of a portion of the nozzle line to be used. As a rate (%) of the nozzles to eject the treatment liquid in the nozzle line capable of ejecting the treatment liquid is increased, the whitening is believed to be more liable to occur. From the point as described above, the use frequency of the nozzles in the nozzle line of the ink jet head to eject the treatment liquid is preferably 70% or less, more preferably 60% or less, and further preferably 50% or less.

The adhesion amount of the treatment liquid to the region to which the treatment liquid and the ink are overlapped and adhered is, with respect to the adhesion amount of the ink, preferably 40 percent by mass or less, more preferably 5 to 30 percent by mass, even more preferably 10 to 25 percent by mass, and further preferably 13 to 20 percent by mass. The adhesion amount is an adhesion amount per unit area obtained after the main scanning is completely performed.

1.6. Ventilation Step

The recording method of this embodiment includes, in the main scanning, a ventilation step of sending a wind to the recording medium.

The ventilation step of sending a wind to the recording medium may be performed in the main scanning in such a manner that while the main scanning is performed, the ventilation step is performed to a portion of the recording medium supported by a recording medium support member, such as a platen, and is also performed in the vicinity of the portion of the recording medium supported by the recording medium support member.

In the ventilation step, the ventilation may be performed to the recording medium located at a position at which the main scanning is performed so that drying of the ink adhered to the recording medium is promoted. Furthermore, the ventilation may be performed so that by removing the solvent component of the ink evaporated from the recording medium, the evaporation therefrom is promoted. For example, the ventilation is not limited to be performed in the vicinity of the surface of the recording medium and may be performed at a position apart from the surface thereof.

The ventilation step can be performed by a ventilation mechanism as described in the above ink jet recording apparatus. A wind velocity in the ventilation step is preferably 0.5 m/s or more, more preferably 1.5 m/s or more, even more preferably 2.0 m/s or more, and further preferably 2.5 m/s or more. In addition, the wind velocity in the ventilation step is preferably 15 m/s or less, more preferably 10 m/s or less, and further preferably 5 m/s or less. Accordingly, an image having a more preferable image quality can be obtained.

The wind velocity is regarded as the maximum wind velocity in the region of the recording medium located at a place supported by the platen and in the region from the surface of the recording medium to the height of the carriage mounting the ink jet head.

A wind temperature in the ventilation step is preferably 35° C. or less, more preferably 33° C. or less, even more preferably 30° C. or less, further preferably 28° C. or less, and particularly preferably 25° C. or less. A wind which is not heated is preferable, and a wind at ordinary temperature is particularly preferable. Although a lower limit of the wind temperature is not particularly limited, the lower limit described above is preferably 10° C. or more, more preferably 15° C. or more, and further preferably 20° C. or more.

While being not influenced by heat other than the temperature of the wind itself, the wind temperature is measured at the position at which the wind velocity is measured.

The ventilation step may be performed using a ventilation mechanism capable of sending a wind to the position at which the ventilation step is performed. For example, a fan may be mentioned.

When the main scanning is performed, the surface temperature of the recording medium to which the ink composition and the treatment liquid are adhered is 33° C. or less.

This temperature may be a surface temperature of the recording medium by the wind temperature in the ventilation step, and when a primary drying step performed with heating is also performed besides the ventilation step, the surface temperature described above is a surface temperature of the recording medium in consideration of the influence of the heat by the primary drying step. The wind temperature may be the same as the surface temperature.

The surface temperature is more preferably 32° C. or less, even more preferably 31° C. or less, and further preferably 30° C. or less. In addition, although not particularly limited, the surface temperature is preferably 20° C. or more, more preferably 25° C. or more, and further preferably 28° C. or more. When the surface temperature is not lower than that described above, it is preferable since the image quality is made more excellent. When the surface temperature is not higher than that described above, it is preferable since the reduction in head dew condensation is made more excellent.

1.7. Other Steps

1. Primary Drying Step

The recording method according to this embodiment may also include, besides the ventilation step, a primary drying step of drying the ink and the treatment liquid adhered to the recording medium.

The primary drying step is a step of drying the ink adhered to the recording medium at an early stage. The primary drying step is a step performed in such a manner that at least part of the solvent component of the ink is dried so as to at least decrease the fluidity of the ink adhered to the recording medium. The primary drying step may be performed by ventilation without heating, may be performed so as to adhere the ink to a heated recording medium, or may also be performed by heating at an early stage after the adhesion.

The primary drying step may be performed by an IR heater, radiation of microwaves, a platen heater, and/or a hot wind sent to the recording medium by a fan.

When the primary drying step is performed, the heating temperature is set so that the surface temperature of the recording surface of the heated recording medium is preferably 28° C. or more and more preferably 30° C. or more. In addition, the heating temperature in the primary drying step is set so that the surface temperature of the recording surface of the heated recording medium is 33° C. or less.

2. Post Heating Step (Secondary Drying Step)

The recording method according to this embodiment may also include, after the image is formed, a post heating step (secondary drying step) of heating the recording medium.

The post heating step is a heating step of completing the recording by sufficient heating so that a recorded matter formed thereby can be used. The post heating step is a heating step of performing sufficient drying of the solvent components of the ink and the treatment liquid and of forming the film of the ink by heating the resin and the like contained in the ink. The post heating step is preferably started more than 0.5 seconds after the image is formed on the recording medium. For example, after the adhesion of the ink and the treatment liquid to the recording region of the recording medium is all completed, the heating is preferably started more than 0.5 seconds on the region described above. In addition, a preferable temperature in the above primary heating step is preferably different from a preferable temperature in the post heating step.

For example, when an ink jet recording apparatus is used, the heating of the recording medium in the post heating step is performed by using an appropriate heating device. In addition, besides the heating device provided in the ink jet recording apparatus, the heating may be performed using an appropriate heating device. In addition, the surface temperature of the recording medium in this case is preferably 60° C. or more, more preferably 70° C. or more, even more preferably 80° C. or more, and further preferably 85° C. or more. In addition, the surface temperature of the recording medium heated by the post heating step is preferably 120° C. or less, more preferably 110° C. or less, even more preferably 100° C. or less, and further preferably 95° C. or less. According to the recording method of this embodiment, even when the surface temperature of the recording medium is in the range described above, the ink can be sufficiently dried, and a recorded matter excellent in abrasion resistance tends to be obtained.

1.8. Operational Effects

According to the recording method described above, in the transport direction of the recording medium, since the treatment liquid is simultaneously ejected at the upstream portion and is not simultaneously ejected at the downstream portion, although not being heated, the image can be made to have an excellent image quality. In addition, according to this recording method, the dew condensation on the ink jet head can be suppressed. Furthermore, according to this recording method, since the treatment liquid and the ink composition can be simultaneously ejected, the recording rate can also be increased.

In addition, by the recording method of this embodiment, even when the recording is performed for a long time, the effects described above can be obtained. That is, even if the recording is continuously performed for one hour or more or further for two hours or more, the effects as described above can be obtained. That is, when the recording time is long, the effects described above can be made more significant.

2. Examples and the Like

Hereinafter, although the present disclosure will be described in more details with reference to Examples and the like, the present disclosure is not limited thereto. Hereinafter, unless otherwise particularly noted, "%" is on a mass basis.

2.1. Preparation of Treatment Liquid and Ink Composition

Components were mixed together to obtain the compositions shown in Table 1, so that treatment liquids, the first color inks, and the second color ink were obtained. In Table 1, the composition is shown on a mass basis. In addition, the colorants (pigments) and the resin particles in the tables each represent a solid content (active ingredient). The pure water was added so that the total mass of the treatment liquid or the ink was 100 percent by mass.

In the above Table 1, the "boiling point" represents the standard boiling point. In addition, the substances not described by the substance names are shown below in detail.

- PG: propylene glycol
- Catiomaster PD-7: amine-epichlorohydrin copolymer, manufactured by Yokkaichi Chemical Company Limited
- BYK-348: silicone-based surfactant, manufactured by BYK Japan KK
- TIPA: triisopropanolamine
- Joncryl 631: styrene acrylic-based resin emulsion, manufactured by BASF Japan
- Hitech E-6500: polyethylene-based wax emulsion, manufactured by Toho Chemical Industry Co., Ltd.
- Black pigment and Yellow pigment: the following pigment dispersion liquids were used. The inks were prepared using those mentioned above.

Black Pigment Dispersion Liquid and Yellow Pigment Dispersion Liquid

In a reaction container equipped with a reflux tube, a gas inlet device, a thermometer, and a stirring device, 198.2 parts of diethylene glycol monobutyl ether, 1.0 part of iodine, 3.7 parts of 2,2'-azobis(4-methoxy-2,4-dimethylvaleronitrile), 66.1 parts of tricyclodecyl methacrylate, and 0.17 parts of diphenylmethane as a catalyst were charged. Next, while a nitrogen gas was allowed to flow, polymerization was performed at 45° C. for 5 hours, so that a solution of an A polymer block was obtained. Subsequently, after the polymerization temperature was decreased to 40° C., to the solution of the A polymer block thus obtained, 44.0 parts of tricyclodecyl methacrylate, 17.2 parts of methacrylic acid, and 1.2 parts of 2,2'-azobis(4-methoxy-2,4-dimethylvaleronitrile) were added. In addition, after the polymerization was performed 4 hours, the temperature was increased to 70° C., and the polymerization was performed for 1 hour to form a B polymer block, so that a solution of an A-B block polymer was obtained. After the solution of the A-B block polymer obtained as described above was cooled, 66.1 parts of diethylene glycol monobutyl ether was added, and the mixture thus obtained was dried at 150° C. for 1 hour, so that a polymer having a solid content of 33.0% was obtained. Next, 341 parts of the polymer described above, 163.6 parts of butyl carbitol, and 450 parts of C.I. Pigment Black 7 used as a black pigment or C.I. Pigment Yellow 155 used as a yellow pigment were mixed together and then stirred by a disper. Subsequently, the pigment was sufficiently dispersed by a horizontal medium disperser, so that an oily pigment dispersion liquid was obtained. Next, while 700 parts of the oily pigment dispersion liquid thus obtained was stirred by a disper, a mixture solution containing 4.0 parts of potassium hydroxide and 341 parts of water was gradually added thereto for neutralization, so that the phase inversion was performed. Subsequently, the pigment was again sufficiently dispersed by the horizontal medium disperser, thereby obtaining the pigment dispersion liquids of the black pigment and the yellow pigment.

2.2. Evaluation Method 2.2.1. Printing Conditions

Printer: SC-R5050 modified machine, manufactured by Seiko Epson Corporation, serial type ink jet recording apparatus as shown in FIG. 1

Resolution: 1,200×1,200 dpi.

Printing pattern: solid pattern

Number of scannings: shown in Tables 2 to 4

Head length: 1.3 inches/head

Surface temperature: shown in Tables 2 to 4: The surface temperature was controlled by a temperature-controlled ventilation mechanism. By a thermocouple fitted to the recording medium, the surface temperature was measured. In addition, except for Example 20 and Comparative Example 6, without using the primary drying step other than the ventilation step, the temperature control was performed with a wind temperature, and in Example 20 and Comparative Example 6, the temperature control was performed using the primary drying step by a platen heater.

Secondary drying temperature: 80° C.

Platen gap: 1.7 mm

Head arrangement: The ink jet heads were controlled to obtain the head arrangements and the ejection nozzles shown in Tables 2 to 4. The arrangements 1 to 5 of the head arrangements are shown in FIG. 4.

Recording medium: prepared as described below.

M1: Orajet 3165G-010, by ORAFOL Japan Inc., poly (vinyl chloride) film $M_2$: regular paper roll (thick type), by Seiko Epson Corporation, regular paper Ventilation step: The recording was performed while ventilation was performed using a ventilation fan shown in FIG. 1. The wind velocity is regarded as the maximum wind velocity in the range from the surface of the recording medium located over the platen to the carriage height. The wind temperature was measured at a position at which the wind velocity was measured. When the wind temperature was measured, the measurement was performed so as not to receive the influence of heat other than the wind temperature.

2.2.2. Viscosity Increase Rate

The viscosity increase rate of the ink obtained when the ink and the treatment liquid of each example were mixed at a mass ratio:(ink:treatment liquid)=(10:1) was measured and is shown in Tables 2 to 4.

2.2.3. Evaluation of Intercolor Bleeding

After the treatment liquid and the ink compositions were filled in the printer as shown in Tables 2 to 4, a solid pattern was printed on the recording medium so that the first color ink and the second color ink were adjacent to each other (the adhesion amounts of the first color ink and the second color ink were each set to 18 mg/inch$^2$ at the maximum). The boundaries between the colors of printed matters were evaluated by visual inspection based on the following criteria, and the results thereof are shown in Tables 2 to 4. In addition, the addition amount of 18 mg/inch$^2$ was regarded to correspond to a duty of 100%.

AA: At duty of 100%, no intercolor bleeding is generated.

A: At duty of 80% or more, intercolor bleeding is generated.

B: At duty of 60% or more, intercolor bleeding is generated.

C: At duty of 50% or more, intercolor bleeding is generated.

D: Even at duty of less than 50%, intercolor bleeding is generated.

2.2.4. Evaluation of Whitening of Printed Matter

After the treatment liquid and the ink compositions were filled in the printer as shown in Tables 2 to 4, the recording medium was set, and a solid pattern (adhesion amount: 18 mg/inch$^2$) was printed only by the first color ink. The printed matter thus formed was evaluated by visual inspection based on the following criteria, and the results thereof are shown in Tables 2 to 4.

A: No whitening is observed in printed matter.

B: Although slightly generated in printed matter, whitening is inconspicuous.

C: Whitening is generated in printed matter and is conspicuous.

2.2.5. Evaluation of Head Dew Condensation

After the treatment liquid and the ink compositions were filled in the printer as shown in Tables 2 to 4, and the recording medium was set, a solid pattern (adhesion amount: 18 mg/inch$^2$) was continuously printed only by the first color ink under the printing conditions (including the continuous printing time) shown in the table, and whether or not generation of non-ejection nozzle occurred was confirmed. The printing was performed in a constant-temperature and constant-moisture room at a temperature of 25° C. and a humidity of 20%. After the printing was performed, the print head was removed, the dew condensation was confirmed on the nozzle surface and evaluated based on the following criteria, and the results thereof are shown in Tables 2 to 4.

A: No dew condensation occurs on nozzle surface.

B: Although dew condensation occurs on nozzle surface, non-ejection nozzle is not generated.

C: Dew condensation occurs on nozzle surface, and non-ejection nozzle is generated.

2.2.6. Evaluation of Printing Rate

After the treatment liquid and the ink compositions were filled in the printer as shown in Tables 2 to 4, and the recording medium (width: 64 inches) was set, a solid pattern (adhesion amount: 18 mg/inch$^2$) was continuously printed only by the first color ink under the printing conditions shown in the table of Examples, and the printing rate was measured. The printing rate was evaluated based on the following criteria, and the results thereof are shown in Tables 2 to 4.

A: Printing rate is more than 15 m$^2$/h.

B: Printing rate is 12 to 15 m$^2$/h.

C: Printing rate is less than 12 m$^2$/h.

2.3. Evaluation Results

According to the following Examples, preferable results in terms of the reduction in intercolor bleeding, the reduction in dew condensation, and the printing rate were obtained, and furthermore, the reduction in whitening of the recorded matter was also preferable. In the Examples described above, the water-based ink composition and the treatment liquid containing an aggregating agent were used; by the portion of the ink jet head to eject the ink composition and the treatment liquid located upstream in the sub-scanning direction, the ink composition and the treatment liquid were overlapped and adhered to the same main scanning region of the recording medium by the same main scanning; by the portion of the ink jet head located downstream in the sub-scanning direction, the ink composition was adhered to the recording medium, and when the ink composition is adhered thereto, the treatment liquid is not overlapped and adhered to the same main scanning region of the recording medium by the same main scanning; in the main scanning, the ventilation step of sending a wind to the recording medium is performed; and when the main scanning is performed, the surface temperature of the recording medium to which the ink composition and the treatment liquid were adhered was 33° C. or less.

On the other hand, in Comparative Example 1, the ventilation step was not used, and the intercolor bleeding was inferior.

In Comparative Examples 2 and 6, the surface temperature of the recording medium was 35° C., and the reduction in head dew condensation was inferior.

In Comparative Example 5, the main scanning in which the ink composition and the treatment liquid were overlapped and adhered to the same main scanning region of the recording medium by the same main scanning was not performed, and the printing rate was inferior.

In Comparative Examples 3 and 4 and Reference Example 1, the main scanning in which when the ink composition was adhered to the recording medium, the treatment liquid was not overlapped and adhered to the same main scanning region of the recording medium by the same main scanning was not performed. In Comparative Example 3, the intercolor bleeding was inferior. In Comparative Example 4, since the surface temperature was set to 35° C., although the reduction in intercolor bleeding was superior, the reduction in head dew condensation was inferior. In Reference Example 1, the recording medium was an absorbing recording medium, and it was found that when the recording medium as described above was used, the intercolor bleeding was not liable to occur.

In Reference Example 2, the recording medium was an absorbing recording medium, and it was found that when the recording medium as described above was used, the solvent component is not likely to evaporate from the ink absorbed in the recording medium, and the reduction in head dew condensation was superior.

The above embodiments and modified examples are described by way of example, and the present disclosure is not limited to those described above. For example, the embodiments and the modified examples may also be variously used in appropriate combination.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and modified examples described above, the following conclusions can be obtained.

A recording method of the present disclosure uses a water-based ink composition and a treatment liquid containing an aggregating agent and includes, a main scanning to eject the ink composition and the treatment liquid from an ink jet head so as to be adhered to a recording medium while the ink jet head is transferred with respect to the recording medium; a sub-scanning to transport the recording medium in a sub-scanning direction which intersects a direction of the main scanning; and a ventilation step of sending a wind to the recording medium in the main scanning. In the main scanning, by a portion of the ink jet ink head to eject the ink composition and the treatment liquid located upstream in the sub-scanning direction, the ink composition and the treatment liquid are overlapped and adhered to the same main scanning region of the recording medium by the same main scanning, and by a portion of the ink jet ink head to eject the ink composition and the treatment liquid located downstream in the sub-scanning direction, the ink composition is adhered to the recording medium, and when the ink composition is adhered thereto, the treatment liquid is not overlapped and adhered to the same main scanning region of the recording medium by the same main scanning. In addition, when the main scanning is performed, the recording medium to which the ink composition and the treatment liquid are adhered has a surface temperature of 33° C. or less.

According to the recording method described above, in the transport direction of the recording medium, since the treatment liquid is simultaneously ejected at the upstream portion and is not simultaneously ejected at the downstream portion, although not being heated, the image can be made to have an excellent image quality. In addition, according to this recording method, the dew condensation on the ink jet head can be suppressed. Furthermore, according to this recording method, since the treatment liquid and the ink composition can be simultaneously ejected, the recording rate can also be increased.

In the recording method described above, by a portion of the ink jet head to eject the ink composition and the treatment liquid, the portion being in an area of one-eighth to one-half of the ink jet head located upstream in the sub-scanning direction, the ink composition and the treatment liquid may be overlapped and adhered to the same main scanning region of the recording medium by the same main scanning.

According to this recording method, the recording rate can be further increased.

In the recording method described above, the ventilation step may be performed at a wind velocity of 1.5 m/s or more.

According to this recording method, an image having a more preferable image quality can be obtained.

In the recording method described above, when the ink composition and the treatment liquid are mixed at a mass ratio:(ink composition:treatment liquid)=(10:1), the ink composition may have a viscosity increase rate of 2.5 times or more.

According to this recording method, an image having a more preferable image quality can be obtained.

In the recording method described above, the recording method may perform recording continuously for one hour or more.

According to this recording method, the effects described above can be made more significant.

In the recording method described above, the number of main scannings performed on the same main scanning region of the recording medium may be 10 times or less.

According to this recording method, a more rapid recording can be performed.

In the recording method described above, the ink jet head may have no nozzle line to eject the treatment liquid at a position located upstream than a nozzle line to eject the ink composition in the sub-scanning direction.

In the recording method described above, the aggregating agent may include a polyvalent metal salt.

According to this recording method, an image having a more preferable image quality can be obtained.

In the recording method described above, the recording medium may be a low-absorbing recording medium or a non-absorbing recording medium.

According to this recording method, the effects described above can be made more significant.

In the recording method described above, the ink jet head may include a nozzle line to eject the treatment liquid at a nozzle use rate of 70% or less.

According to this recording method, the effects described above can be made more significant.

A recording apparatus includes the ink jet head and a ventilation mechanism to perform the ventilation step described above and performs the recording method described above.

According to the recording apparatus described above, in the transport direction of the recording medium, since the treatment liquid is simultaneously ejected at the upstream portion and is not simultaneously ejected at the downstream portion, although not being heated, the image can be made to have an excellent image quality. In addition, according to this recording apparatus, the dew condensation on the ink jet head can be suppressed. Furthermore, according to this recording apparatus, since the treatment liquid and the ink composition can be simultaneously ejected, the recording rate can also be increased.

What is claimed is:

1. A recording method which uses a water-based ink composition and a treatment liquid containing an aggregating agent and is performed by a recording apparatus that includes an ink jet head, the recording method comprising:

a main scanning to eject the ink composition and the treatment liquid from an from the ink jet head so as to be adhered to a recording medium while the ink jet head is transferred with respect to the recording medium;

a sub-scanning to transport the recording medium in a sub-scanning direction which intersects a direction of the main scanning; and a ventilation step of sending a wind to the recording medium in the main scanning, wherein the ink jet head includes a first nozzle line and a second nozzle line, the first nozzle line includes a portion (A) located upstream in the sub-scanning direction and a portion (B) located downstream in the sub-scanning direction, the portion (A) and the portion (B) each being configured to eject the ink composition which is the same ink composition, the second nozzle line includes a portion (C) located upstream in the sub-scanning direction and overlapping with the portion (A) in the main scanning direction, and a portion (D) located downstream in the sub-scanning direction and overlapping with the portion (B) in the main scanning direction, the portion (C) and the portion (D) each being configured to eject the treatment liquid, in the main scanning, the ink composition is ejected from the portion (A) and the treatment liquid is ejected from the portion (C) so that the ink composition and the treatment liquid are overlapped and adhered to the same main scanning region of the recording medium by the same main scanning, in the main scanning, the ink composition is ejected from the portion (B) and the treatment is liquid refrained from being ejected from the portion (D) so that the ink composition is adhered to the recording medium, and when the ink composition is adhered thereto, the treatment liquid is not overlapped and adhered to the same main scanning region of the recording medium by the same main scanning, and when the main scanning is performed, the recording medium to which the ink composition and the treatment liquid are adhered has a surface temperature of 33° C. or less.

2. The recording method according to claim 1, wherein by the portion (A) of the first nozzle line to eject the ink composition and the portion (C) of the second nozzle line to eject the treatment liquid, the portion (C) being in an area of one-eighth to one-half of the second nozzle line located upstream in the sub-scanning direction, the ink composition and the treatment liquid are overlapped and adhered to the same main scanning region of the recording medium by the same main scanning.

3. The recording method according to claim 1, wherein the ventilation step is performed at a wind velocity of 1.5 m/s or more.

4. The recording method according to claim 1, wherein when the ink composition and the treatment liquid are mixed at a mass ratio:(ink composition:treatment liquid)=(10:1), the ink composition has a viscosity increase rate of 2.5 times or more.

5. The recording method according to claim 1, wherein the recording method performs recording continuously for one hour or more.

6. The recording method according to claim 1, wherein the number of main scannings performed on the same main scanning region of the recording medium is 10 times or less.

7. The recording method according to claim 1, wherein the ink jet head has no nozzle line to eject the treatment liquid at a position located upstream than a nozzle line to eject the ink composition in the sub-scanning direction.

8. The recording method according to claim 1, wherein the aggregating agent includes a polyvalent metal salt.

9. The recording method according to claim 1, wherein the recording medium is a low-absorbing recording medium or a non-absorbing recording medium.

10. The recording method according to claim 1, wherein the ink jet head includes a nozzle line to eject the treatment liquid at a nozzle use rate of 70% or less.

11. A recording apparatus to perform the recording method according to claim 1, the apparatus comprising:

the ink jet head; and a ventilation mechanism to perform the ventilation step.

* * * * *